(12) United States Patent
Dyke-Wells

(10) Patent No.: US 7,585,224 B2
(45) Date of Patent: Sep. 8, 2009

(54) STORAGE MEDIUM HAVING GAME PROGRAM STORED THEREIN AND GAME APPARATUS

(75) Inventor: Tancred Dyke-Wells, Godalming (GB)

(73) Assignee: Nintendo Co., Ltd., Kyoto (JP)

( * ) Notice: Subject to any disclaimer, the term of this patent is extended or adjusted under 35 U.S.C. 154(b) by 69 days.

(21) Appl. No.: 11/123,227

(22) Filed: May 6, 2005

(65) Prior Publication Data

US 2006/0246968 A1    Nov. 2, 2006

(30) Foreign Application Priority Data

Apr. 28, 2005    (JP)    ............................. 2005-133233

(51) Int. Cl.
*G06F 17/00*    (2006.01)

(52) U.S. Cl. ............................... 463/31; 463/5; 463/32; 463/52; 463/53; 273/108.1; 273/127 R; 273/317.1; 273/348; 345/419; 345/473; 345/619; 348/141; 348/142; 348/240.99; 715/757; 715/764

(58) Field of Classification Search ................. 463/1–5, 463/7–8, 16, 23, 30–34, 36–39, 40–43, 46–57; 273/108.1, 148 B, 150, 262, 317.1, 359, 329–330, 273/406–408, 441–442, 460–461, 127 R, 273/148 R, 309, 340, 348, 361–367; 345/156–158, 345/167, 473–475, 664, 679, 1.1–3.4, 419, 345/618–619, 629; 715/856, 706, 738, 757, 715/762–764; 348/37, 141–142, 240.99
See application file for complete search history.

(56) References Cited

U.S. PATENT DOCUMENTS 5,755,620 A * 5/1998 Yamamoto et al. ............. 463/34

5,800,265 A * 9/1998 Yamazaki et al. ............. 463/23

(Continued)

FOREIGN PATENT DOCUMENTS

JP    2002-11243    1/2002

(Continued)

OTHER PUBLICATIONS

Blizzard Entertainment, "Warcraft: Orcs and Humans," pp. 1-81, 1994-1995.

(Continued)

*Primary Examiner*—Peter DungBa Vo
*Assistant Examiner*—Arthur O. Hall
(74) *Attorney, Agent, or Firm*—Nixon & Vanderhye P.C.

(57) ABSTRACT

A game apparatus selects one of a plurality of characters as a selected character. The game apparatus also sets a position of a virtual camera in accordance with the position of the selected character and thus causes a display apparatus to display an image of a game space, and also causes the display apparatus to display a cursor for designating a predetermined position in the game space. When a predetermined operation by the player is performed in the state where one of the non-selected characters is designated by the cursor, the game apparatus sets the non-selected character designated by the cursor as a newly selected character. When the selected character is changed in a first change step, the position of the virtual camera is moved in accordance with the position of the newly selected character.

12 Claims, 14 Drawing Sheets

U.S. PATENT DOCUMENTS

| | | | | |
|---|---|---|---|---|
| 6,093,105 | A * | 7/2000 | Morihira | 463/38 |
| 6,154,197 | A * | 11/2000 | Watari et al. | 345/161 |
| 6,165,073 | A * | 12/2000 | Miyamoto et al. | 463/32 |
| 6,166,718 | A * | 12/2000 | Takeda | 715/856 |
| 6,196,917 | B1 * | 3/2001 | Mathias et al. | 463/2 |
| 6,259,431 | B1 | 7/2001 | Futatsugi et al. | |
| 6,295,064 | B1 * | 9/2001 | Yamaguchi | 345/419 |
| 6,424,353 | B2 * | 7/2002 | Yamamoto et al. | 345/619 |
| 6,468,157 | B1 * | 10/2002 | Hinami et al. | 463/32 |
| 6,500,069 | B1 * | 12/2002 | Ohba et al. | 463/31 |
| 6,544,123 | B1 * | 4/2003 | Tanaka et al. | 463/36 |
| 6,602,139 | B2 * | 8/2003 | Yamaguchi | 463/30 |
| 6,667,741 | B1 * | 12/2003 | Kataoka et al. | 345/426 |
| 6,921,336 | B1 * | 7/2005 | Best | 463/32 |
| 6,972,756 | B1 * | 12/2005 | Yamamoto | 345/419 |
| 7,033,275 | B1 * | 4/2006 | Endo et al. | 463/33 |
| 7,285,047 | B2 * | 10/2007 | Gelb et al. | 463/31 |
| 7,371,163 | B1 * | 5/2008 | Best | 463/1 |
| 7,470,195 | B1 * | 12/2008 | Baldwin et al. | 463/33 |
| 7,492,362 | B2 * | 2/2009 | Sakagawa et al. | 345/419 |
| 2001/0026265 | A1 * | 10/2001 | Kikuchi et al. | 345/157 |
| 2001/0049301 | A1 | 12/2001 | Masuda et al. | |
| 2002/0063776 | A1 * | 5/2002 | Nagayama et al. | 348/51 |
| 2003/0003978 | A1 * | 1/2003 | Tsuchida | 463/7 |
| 2003/0017872 | A1 * | 1/2003 | Oishi et al. | 463/33 |
| 2003/0119587 | A1 * | 6/2003 | Ohba et al. | 463/31 |
| 2003/0166413 | A1 * | 9/2003 | Hayashida et al. | 463/30 |
| 2003/0186741 | A1 * | 10/2003 | Hayashida et al. | 463/31 |
| 2003/0216177 | A1 * | 11/2003 | Aonuma et al. | 463/32 |
| 2004/0046800 | A1 * | 3/2004 | Emerson | 345/810 |
| 2004/0075699 | A1 * | 4/2004 | Franchi et al. | 345/860 |
| 2004/0157662 | A1 * | 8/2004 | Tsuchiya | 463/32 |
| 2004/0176164 | A1 * | 9/2004 | Kobayashi | 463/30 |
| 2007/0149283 | A1 * | 6/2007 | Poh et al. | 463/37 |
| 2008/0248848 | A1 * | 10/2008 | Rippy et al. | 463/9 |

FOREIGN PATENT DOCUMENTS

| | | |
|---|---|---|
| JP | 2002-066131 | 3/2002 |
| JP | 2002-373350 | 12/2002 |
| JP | 2003-263655 | 9/2003 |
| JP | 2005-34277 | 2/2005 |

OTHER PUBLICATIONS

Blizzard Entertainment, "Warcraft II—Battle.net Edition," pp. 1-96, 1995-1999.

Blizzard Entertainment, "Warcraft: Reign of Chaos," pp. 1-93.

* cited by examiner

STORAGE MEDIUM HAVING GAME PROGRAM STORED THEREIN AND GAME APPARATUS

BACKGROUND OF THE INVENTION

1. Field of the Invention

The present invention relates to a storage medium having a game program stored therein and a game apparatus; and more specifically to a storage medium having a game program stored therein for executing a game in which a plurality of characters appear, each of which can be an operation target of a player, and a game apparatus.

2. Description of the Background Art

Conventionally, games in which one player performs an operation on a great number of game characters (hereinafter, referred to simply as "characters") at the same time have been proposed. An exemplary game apparatus used for performing an operation on a great number of characters collectively at the same time is described in Japanese Laid-Open Patent Publication No. 2002-66131 (Patent Document 1). This game apparatus is for executing a war game in which a plurality of solders appear. In this game, a military unit is formed of a plurality of solders including a commander (leader), and the player can directly perform an operation on a solder character acting as the leader. The player can also issue an instruction to move or attack to each solder character belonging to the unit led by the leader. In this way, the player can perform an operation on the plurality of solder characters at the same time.

With the game apparatus described in Patent Document 1, the player can issue simple instructions to solder characters other than the leader, but cannot perform a detailed operation individually on each solder character. Namely, with the above-described game apparatus, the player can issue rough instructions, but not detailed instructions, to each solder character other than the leader. Therefore, the degree of freedom of the player in performing an operation on the entire unit is low, and there is a narrower variety of actions which can be performed by each solder character of the unit. This involves the risk of making the game monotonous.

SUMMARY OF THE INVENTION

Therefore, an object of the present invention is to provide a game program and a game apparatus for executing a game in which the player can perform an operation on a plurality of characters acting at the same time and can issue more detailed instructions on a motion of each character.

The present invention has the following features to attain the object mentioned above. The reference numerals, additional explanations and the like in parentheses in this section of the specification indicate the correspondence with the examples described later for easier understanding of the present invention and do not limit the present invention in any way.

A first aspect of the present invention is directed to a storage medium having a game program stored therein to be executed by a computer (CPU 31) of a game apparatus (3) for causing a display apparatus (TV 2) to display an image of a three-dimensional game space, in which a plurality of characters (player-side characters 71 through 75) each of which can be an operation target of a player appear, as seen from a virtual camera. The game program causes the computer to execute a selection step (S2); a motion control step (S5, S8); a first display control step (S10); a designation target change step (S22); a first change step (S33), and a second display control step (S34). In the selection step, the game apparatus selects one of the plurality of characters as a selected character (71). In the motion control step, the game apparatus causes the selected character to perform a motion in accordance with an operation by the player, and causes non-selected characters, which are the plurality of characters other than the selected character, to perform a motion based on a predetermined motion rule. In the first display control step, the game apparatus sets a position of the virtual camera in accordance with a position of the selected character and thus causes the display apparatus to display an image of a partial area of the three-dimensional game space taken by the virtual camera, and causes the display apparatus to display a cursor (aiming cursor 76 or ground cursor 77). For example, in the first display control step, the position of the virtual camera is determined such that the virtual camera takes at least an image of the selected character, or the position of the virtual camera is determined at the viewpoint of the selected character. In the designation target change step, the game apparatus changes a target designated by the cursor on the image of the partial area in accordance with an operation by the player. For example, in the designation target change step, the target designated by the cursor on the image of the partial area may be changed by changing the setting of the virtual camera and thus changing the image of the partial area, or the target designated by the cursor on the image of the partial area may be changed by moving the cursor on the image of the partial area. In the first change step, when a first operation (change operation) by the player is performed in the state where one of the non-selected characters is designated by the cursor on the image of the partial area, the game apparatus changes the current selected character to a non-selected character and changes the non-selected character designated by the cursor to a newly selected character. The "state where one of the non-selected characters is designated by the cursor" is, for example, a state where the cursor overlaps the non-selected character on the image of the partial area, or a state where the cursor is located in the vicinity of (within a predetermined area from) the non-selected character. In the second display control step, when the selected character is changed in the first change step, the game apparatus changes the position of the virtual camera in accordance with a position of the newly selected character and thus causes the display apparatus to display a partial area of the three-dimensional game space taken by the post-movement virtual camera.

According to a second aspect of the present invention, in the first display control step, the cursor may be displayed as being fixed at the center of the image of the partial area. In this case, in the designation target change step, the target designated by the cursor on the image of the partial area is changed by changing a setting of the virtual camera in accordance with the operation by the player and thus changing the image of the partial area. In the first change step, the non-selected character which is first collided against by a straight line extending from the position of the virtual camera toward a viewing direction thereof is determined as the non-selected character designated by the cursor.

According to a third aspect of the present invention, in the motion control step, an orientation of the selected character may be controlled in accordance with an operation by the player. In this case, in the designation target change step, the target designated by the cursor on the image of the partial area is changed by setting the viewing direction of the virtual camera in accordance with the orientation of the selected character and thus changing the image of the partial area.

According to a fourth aspect of the present invention, in the first display control step, when there is a non-selected character collided against by the straight line extending from the position of the virtual camera toward the viewing direction thereof, an image representing the non-selected character which is first collided against by the straight line (ground cursor 77 shown in FIG. 4) may be displayed.

According to a fifth aspect of the present invention, in the first display control step, a list of corresponding images (state windows) respectively corresponding to the non-selected characters including a non-selected character outside the partial area may further be displayed regardless of the setting of the virtual camera. In this case, the game program causes the computer to further execute a designation step (S39) and a second change step (S41). In the designation step, when a second operation by the player is performed, the game apparatus designates one of the corresponding images sequentially in accordance with a predetermined order. In the second change step, when the first operation by the player is performed in the state where any one of the corresponding images is designated, the game apparatus changes the current selected character to a non-selected character, and changes the non-selected character represented by the designated corresponding image to a newly selected character.

According to a sixth aspect of the present invention, the designated corresponding image may be displayed over the image of the game space.

According to a seventh aspect of the present invention, in the first display control step, a state image (image and gauge in the state window) indicating the state of the non-selected character represented by the designated corresponding image may be displayed together with the designated corresponding image.

According to an eighth aspect of the present invention, in the motion control step, the motion of the non-selected characters may be controlled based on one of a plurality of predetermined motion rules. In this case, the game program causes the computer to further execute a third change step. In the third change step, when a third operation by the player is performed in the state where one of the non-selected characters is designated by the cursor, the game apparatus changes the motion rule for the non-selected character designated by the cursor to a predetermined motion rule.

According to a ninth aspect of the present invention, in the first display control step, a list of corresponding images respectively corresponding to the non-selected characters including a non-selected character outside the partial area may further be displayed regardless of the setting of the virtual camera. In this case, the game program causes the computer to further execute a designation step and a third change step. In the designation step, when a second operation by the player is performed, the game apparatus designates one of the corresponding images sequentially in accordance with a predetermined order. In the third change step, when a third operation by the player is performed in the state where any one of the corresponding images is designated, the game apparatus changes a motion rule for a non-selected character represented by the designated corresponding image to the predetermined motion rule.

According to a tenth aspect of the present invention, the game program may cause the computer to further execute a character motion step (S25). In the character motion step, the game apparatus causes the selected character to perform a predetermined motion (shooting motion) in accordance with a motion instruction operation by the player. In this case, the motion instruction operation is identical to the first operation performed in the first change step. In the character motion step, the selected character performs a predetermined motion with the condition that none of the non-selected characters is designated by the cursor.

The present invention may be provided in the form of a game apparatus having functions equivalent to the functions realized by executing the above-described game program.

According to the first aspect of the present invention, the player can select any one of a plurality of selectable characters as an operation target, and also freely change the character used as the operation character. This allows the player to issue a more detailed instruction than by the conventional art on an individual motion of each player-side character. The player can also change the character on which the player wishes to perform a detailed operation, in accordance with the state of the game. Since this remarkably broadens the variety of actions which can be performed by the player-side unit, the strategic level of the game is improved and a more interesting game can be provided.

Also according to the first aspect of the present invention, an image of a partial area of the three-dimensional game space taken by the virtual camera, which is set in accordance with the position of the current selected character, is displayed. Therefore, an operation is easily performed on the currently selected character in the three-dimensional game space. Since a cursor is displayed over the image, a newly selected character can be intuitively designated on the same image. Namely, according to the first aspect, the operation performed on the current selected character in the three-dimensional game space is made easy, and at the same time, a newly selected character can be intuitively designated on the same image. Therefore, the game operation of selecting, and performing an operation on, one of a plurality of characters, while switching the selected character and thus performing an operation on the entirety of a plurality of characters, can be realized intuitively and efficiently.

Further according to the first aspect of the present invention, when the selected character is changed, the setting of the virtual camera is changed and thus the displayed game screen is changed. Therefore, the player can instantaneously and intuitively perceive which character the newly selected character is, and can also instantaneously and intuitively perceive that the selected character has been changed.

According to the second aspect, the cursor is always displayed in the viewing direction of the virtual camera. Since a non-selected character existing in the viewing direction can be designated by the cursor, the player can intuitively change the selected character.

According to the third aspect, the orientation of the virtual camera is set in accordance with the orientation of the selected character. Therefore, the operation of moving the selected character and the operation of moving the cursor can be performed at the same time. Consequently, the player can easily perform the operation of controlling the motion of the selected character and also can intuitively change the selected character.

According to the fourth aspect, the player can perceive the non-selected character designated by the cursor immediately and intuitively.

According to the fifth aspect, a non-selected character which is not displayed on the screen can be designated as the character to be selected next by designating the non-selected character using a corresponding image. Therefore, even a non-selected character which cannot be designated by the cursor can be designated. Also according to the fifth aspect, the operation method of designating the target displayed on the screen by the cursor, and the operation method of designating the target not displayed on the screen by the corresponding image, are both usable. This allows the player to choose the appropriate method in accordance with the state of the game. Moreover, these two operation methods can be realized by the same operation (first operation), which makes the game operation easy.

According to the sixth aspect, even while the corresponding images are displayed, the image of the game space is displayed. Therefore, it is not necessary to temporarily stop the game in order to display the corresponding images, and thus the corresponding images can be displayed while the game is continued without being disturbed.

According to the seventh aspect, the player can learn the state of even a non-selected character which is not displayed on the screen to some extent. Therefore, even when non-selected characters are not displayed on the screen, the player can determine which of the non-selected characters is to be set as the newly selected character.

According to the eighth aspect, the player can issue a rough instruction to a non-selected character. More specifically, the player can either control the motion of the player-side characters in detail or roughly, in accordance with the state of the game. Since this broadens the variety of actions which can be performed by the entire player-side characters, the strategic level of the game is further improved.

According to the ninth aspect, the non-selected character as a target to which a motion is to be instructed can be designated using a corresponding image. This allows a non-selected character which is not displayed on the screen to be designated as the character to be instructed next. Therefore, even a non-selected character which cannot be designated by the cursor can be designated. Also according to the ninth aspect, the operation method of designating the target displayed on the screen by the cursor, and the operation method of designating the target not displayed on the screen by the corresponding image, are both usable. This allows the player to choose the appropriate method in accordance with the state of the game. Moreover, these two operation methods can be realized by the same operation (third operation), which makes the game operation easy.

According to the tenth aspect, the instruction of selecting a non-selected character and the instruction of moving the selected character can be realized by one type of operation. Since this simplifies the action performed by the player, the maneuvability of the game can be improved.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
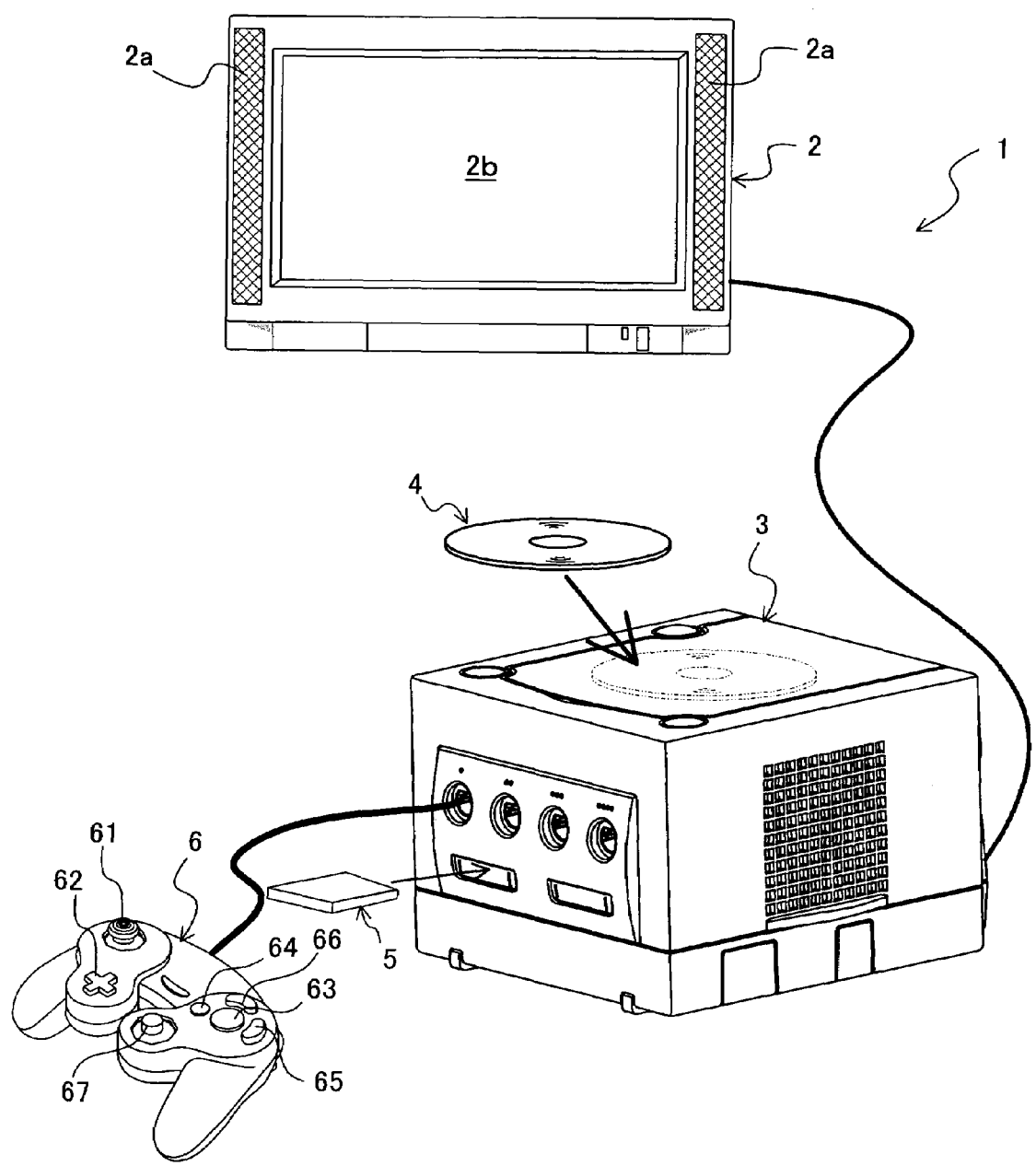
FIG. 1 is an external view of a game system including a game apparatus according to one embodiment of the present invention.

Hereinafter, a game apparatus and a game program according to one embodiment of the present invention, and a game system including such a game apparatus will be described. FIG. 1 is an external view of a game system 1. In this embodiment, an installation-type game apparatus will be described as an exemplary game apparatus according to the present invention. However, the game system is not limited to this, and the present invention is applicable to a device having a computer for executing a game program mounted thereon, such as mobile game apparatuses, arcade game apparatuses, mobile terminals, cellular phones, personal computers, and the like.

In FIG. 1, the game system 1 includes an installation-type game apparatus (hereinafter, referred to simply as a "game apparatus") 3, and a TV receiver (hereinafter, referred to simply as a "TV") 2 as an exemplary display apparatus connected to the game apparatus 3 via a connection cord. The game apparatus 3 is connected to a controller 6 having a plurality of switches operable by a player. On the game apparatus 3, an optical disc 4 is detachably mounted as an exemplary information storage medium having a game program according to the present invention stored therein. Also on the game apparatus 3, a cartridge 5 having a flash memory or the like for storing saved data of the game is detachably mounted when necessary. The game apparatus 3 displays, on the TV 2, a game image obtained by executing a game program stored in the optical disc 4. The game apparatus 3 can also resume the game executed in the past or reproduce a game state executed in the past using the saved data stored in the cartridge 5, and display the game image on the TV 2. The player of the game apparatus 3 can enjoy the game by operating the controller 6 while watching the game image displayed on the TV 2.

The controller 6 is detachably connected to the game apparatus 3 via the connection cord as described above. The controller 6 is operation means mainly for performing an operation on a player object (an object which is an operation target of the player (character)) appearing in a game space displayed on the TV 2. The controller 6 includes an input section having operation buttons, keys, sticks and the like as a plurality of operation switches. Specifically, the controller 6 includes a grip section to be held by the player. The controller 6 includes a main stick 61 and a cross-shaped key 62 which are operable by the thumb or the like of the left hand of the player, and a C stick 67, an A button 63 and the like which are operable by the thumb or the like of the right hand of the player. The controller 6 also includes a B button 64, an X button 65, a Y button 66, and a start/pause button. The controller 6 further includes an R button and a Z button which are operable by the index finger or the like of the right hand of the player, and an L button operable by the index finger or the like of the left hand of the player. The game system 1, in the case where a plurality of controllers 6 are connected to the game apparatus 3, allows a plurality of players to play the game at the same time.

Figure 2:
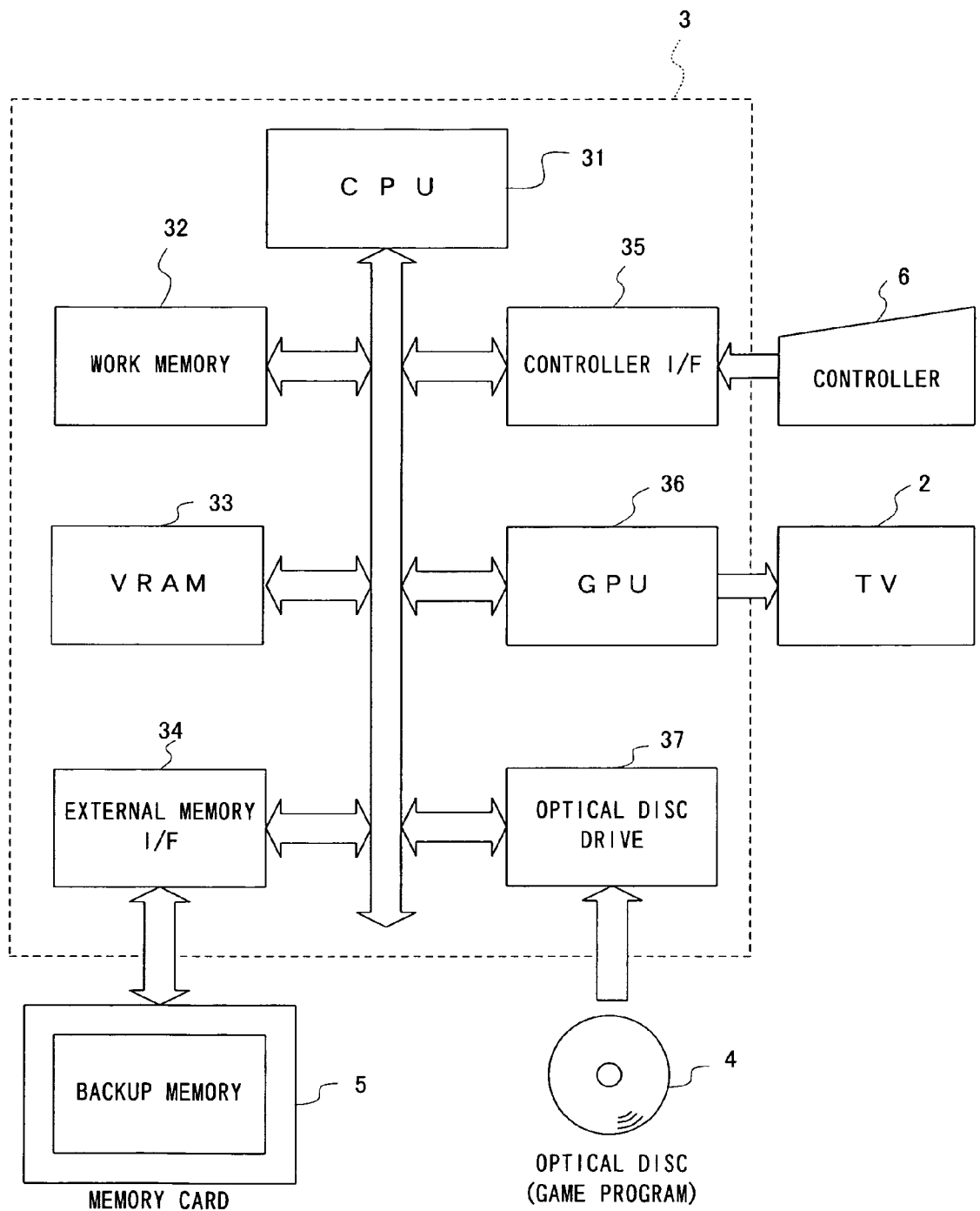
FIG. 2 is a functional block diagram of the game system 1.

Next, a structure of the game apparatus 3 according to the present invention will be described with reference to FIG. 2. FIG. 2 is a functional block diagram of the game system 1. In FIG. 2, the game apparatus 3 includes a CPU (central processing unit) 31 for executing various types of programs. The CPU 31 executes a start program stored in a boot ROM (not shown) to, for example, initialize a work memory 32 and the like. Then, the CPU reads a game program stored in the optical disc 4 into the work memory 32, and after that, executes the game program to perform game processing in accordance with the game program. The CPU 31 is connected to the work memory 32, a video RAM (VRAM) 33, an external memory interface (I/F) 34, a controller interface (I/F) 35, a GPU (Graphics Processing Unit) 36, and an optical disc drive 37 via a bus.

The work memory 32 is a storage area used by the CPU 31, and appropriately stores a game program and the like required for the processing performed by the CPU 31. For example, the work memory 32 stores a game program, various types of data and the like read from the optical disc 4 by the CPU 31. The game program, various types of data and the like stored in the work memory 32 are executed by the CPU 31. The VRAM 33 stores game image data for displaying game images on the TV 2. The external memory I/F 34 engages the cartridge 5 with a connector (not shown) to communicably connect the game apparatus 3 and the cartridge 5 to each other. The CPU 31 accesses a backup memory provided in the cartridge 5 via the external memory I/F 34. The controller I/F 35 communicably connects an external device and the game apparatus 3 to each other via a connector (not shown). For example, the controller 6 is engaged with the connector via a connection cord and is connected to the game apparatus 3 via the controller I/F 35. In accordance with the operation by the player on the analog (main) stick 61 and the C stick 67 and the pressing operation by the player on the operation buttons 62 through 66 and the like, the controller 6 outputs operation data indicating the operation contents to the game apparatus 3. The GPU 36 is formed of, for example, a semiconductor chip for performing processing including vector operations and rendering processing which are necessary for 3D graphics display in accordance with instructions from the CPU 31. A game image rendered by the GPU 36 is displayed on the TV 2. The optical disc drive 37 reads various types of data including the game program, image data and sound data stored in the optical disc 4 in accordance with instructions from the CPU 31.

Hereinafter, game processing executed by the game apparatus 3 in accordance with the game program stored in the optical disc 4 will be described. First, an overview of the game in this embodiment will be described. This game is a war game in which solders and tanks fight in a three-dimensional virtual game space. A player plays the game with an aim of defeating the enemy unit by performing an operation on his/her unit including solders, tanks and the like.

In this game, a plurality of characters appear in the game space. The characters include, for example, solder characters created to look like actual solders and tank characters created to look like actual tanks. The plurality of characters appearing in the game space are roughly classified into enemy characters and player-side characters. When one player plays the game, the player performs an operation on the player-side characters.

The player-side characters are characters operable by the player. The player can select any one of the player-side characters as an operation target. The number of the player-side characters which can be selected by the player as a selected target at a time is one. A method for selecting the operation target will be described later. The player can issue detailed instructions to the player-side character selected as the operation target like in an action game. For example, the player can perform detailed operations on the player-side character as the operation target, such as an operation of causing the character to attack (shoot) or an operation of causing the character to move forward, backward, leftward or rightward, using the controller 6. Hereinafter, the player-side character selected as the operation target will be referred to as a "selected character", and the player-side characters other than the selected character will be referred to as "non-selected characters".

Motions of the non-selected characters are controlled by the game apparatus 3. More specifically, the game apparatus 3 controls the motions of the non-selected characters based on a predetermined motion rule. A conceivable motion rule may be, for example, a rule of "attacking an enemy character located within a predetermined range from the non-selected character itself" and a rule of "moving as following the selected character". In this embodiment, the non-selected characters each act in accordance with the motion rule of "attacking an enemy character located within a predetermined range from the non-selected character itself" unless there is no instruction from the player. In other embodiments, different motion rules may be assigned to different non-selected characters. The game apparatus 3 controls the motion of each non-selected character based on the motion rule assigned thereto.

As described above, the non-selected characters actively perform motions even without an instruction from the player. However, the player is allowed to issue an instruction on a motion to be performed by a non-selected character. Specifically, the player is allowed to issue an instruction on a motion rule to be assigned to a non-selected character. When instructed by the player, the non-selected characters perform a motion in accordance with the motion rule instructed by the player. A method for issuing an instruction to the non-selected characters will be described later.

Motions of the enemy characters are controlled by the game apparatus 3 in accordance with a motion rule prepared in the game program. The motion rule assigned to the enemy characters and the motion rule assigned to the player-side characters may be the same as, or different from, each other. When two players play the game, operations on the enemy characters may be performed by the other player (the player different from the player who performs an operation on the player-side characters).

This game proceeds in real time. Accordingly, even while the player is not performing any operation on the selected character, the non-selected characters and the enemy characters perform motions. Thus, the state of the game (the situation of the war) changes moment by moment. The player plays the game by operating the operation target (the selected character), changing the operation target, issuing an instruction to a non-selected character, etc., appropriately in accordance with the game state.

Figure 3:
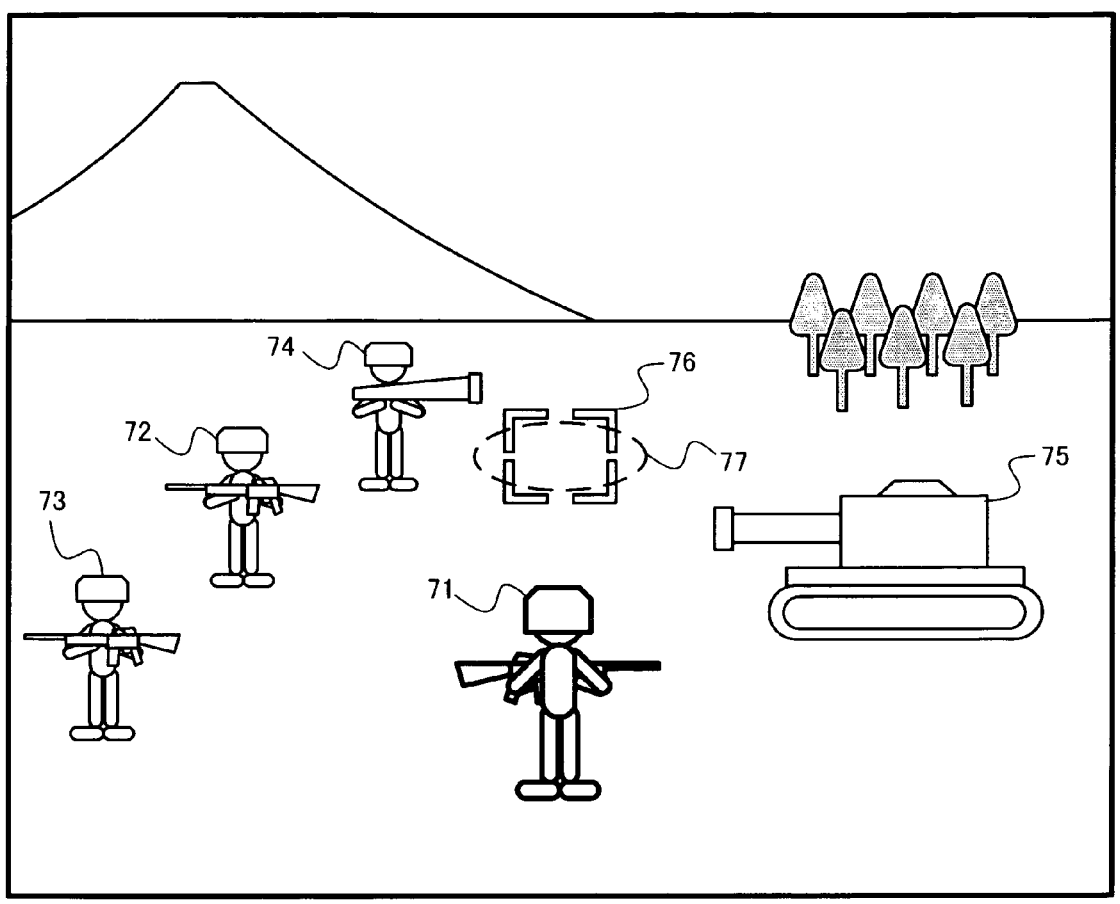
FIG. 3 shows an exemplary game screen in this embodiment.

FIG. 3 shows an exemplary game screen in this embodiment. As shown in FIG. 3, an image of the game space as seen from a virtual camera is displayed on the screen of the TV 2. In FIG. 3, solder characters 71 through 73 each carrying a rifle (rifle solder characters), a solder character carrying a bazooka 74 (bazooka solder character), and a tank character 75 appear in the game space created to look like an actual battlefield. In FIG. 3, the rifle solder character 71 is the selected character, and the other characters 72 through 75 are non-selected characters. FIG. 3 does not show the enemy characters.

As shown in FIG. 3, in this embodiment, an image of the game space, which shows an area in front of the selected character as seen from behind the selected character 71, is displayed on the screen. Namely, the virtual camera is set at a predetermined position behind the selected character 71 and is oriented toward the area in front of the selected character 71. As can be appreciated from the above, in this embodiment, the position of the virtual camera is determined in accordance with the position of the selected character. The orientation of the virtual camera (the viewing direction) is determined in accordance with the orientation of the selected character. Accordingly, when the selected character is changed, the position and the orientation of the virtual camera are changed. As a result, the game image displayed on the screen is also changed. In other embodiments, the image of the game space may be displayed with the subjective viewpoint of the selected character. Namely, the position of the virtual camera may be set at the viewpoint of the selected character.

As shown in FIG. 3, an aiming cursor 76 and a ground cursor 77 are displayed on the screen. In FIG. 3, the aiming cursor 76 has a shape having four corners of a quadrangular. The game apparatus 3 displays the aiming cursor 76 such that the center of the aiming cursor 76 is the look at point of the virtual camera. Accordingly, the aiming cursor 76 is displayed at the center of the screen (or the game image). The ground cursor 77 has a circular shape drawn on the ground, the center of which is the look at point mentioned above. In this embodiment, the ground cursor 77 is drawn on the ground. Accordingly, when the ground cursor 77 is located on a slope, the ground cursor 77 is drawn on the slope. In other embodiments, at least one of the aiming cursor 76 and the ground cursor 77 needs to be displayed.

In the state shown in FIG. 3, the player can cause the rifle solder character 71 as the selected character to perform detailed motions. Specifically, the player can tilt the analog stick 61 of the controller 6 in a desired direction to cause the selected character 71 to move in a direction corresponding to the direction in which the analog stick 61 is tilted. The player can also press the A button 63 of the controller 6 to cause the selected character 71 to perform an attack motion (shooting motion). As described above, in this embodiment, the player can perform a moving operation and an attack operation on the selected character as the operation target.

The position and the orientation of the virtual camera change in accordance with the position and the orientation of the selected character 71. Therefore, the positions designated by the aiming cursor 76 and the ground cursor 77 (i.e., the positional relationship between each of the cursors 76 and 77 with the game space) change in accordance with the position and the orientation of the selected character 71. For example, when the selected character 71 moves forward from the position shown in FIG. 3, the positions designated by the aiming cursor 76 and the ground cursor 77 move forward. At this point, the aiming cursor 76 and the ground cursor 77 remain displayed at the center of the screen, and the positions designated by the cursors change by the game space scrolling downward in FIG. 3. As appreciated from this, when wishing to change the positions designated by the aiming cursor 76 and the ground cursor 77, the player may move the selected character 71.

The aiming cursor 76 and the ground cursor 77 are used as an aiming point for the selected character 71. For example, when the player performs an attack operation (the operation of pressing the A button 63) in the state shown in FIG. 3, the selected character 71 performs a shooting motion. As a result, a rifle bullet is discharged from the rifle of the selected character 71 toward the position designated by the aiming cursor 76 (the look at point of the virtual camera). The aiming cursor 76 and the ground cursor 77 are also used for designating a non-selected character in addition to as the aiming point for the selected character 71. More specifically, for changing the selected character, the aiming cursor 76 and the ground cursor 77 are used for designating a non-selected character to be the selected character next (see FIG. 4 and FIG. 5). For issuing an instruction to a non-selected character, the aiming cursor 76 and the ground cursor 77 are used for designating a non-selected character to which the instruction is to be issued, for example.

Figure 4:
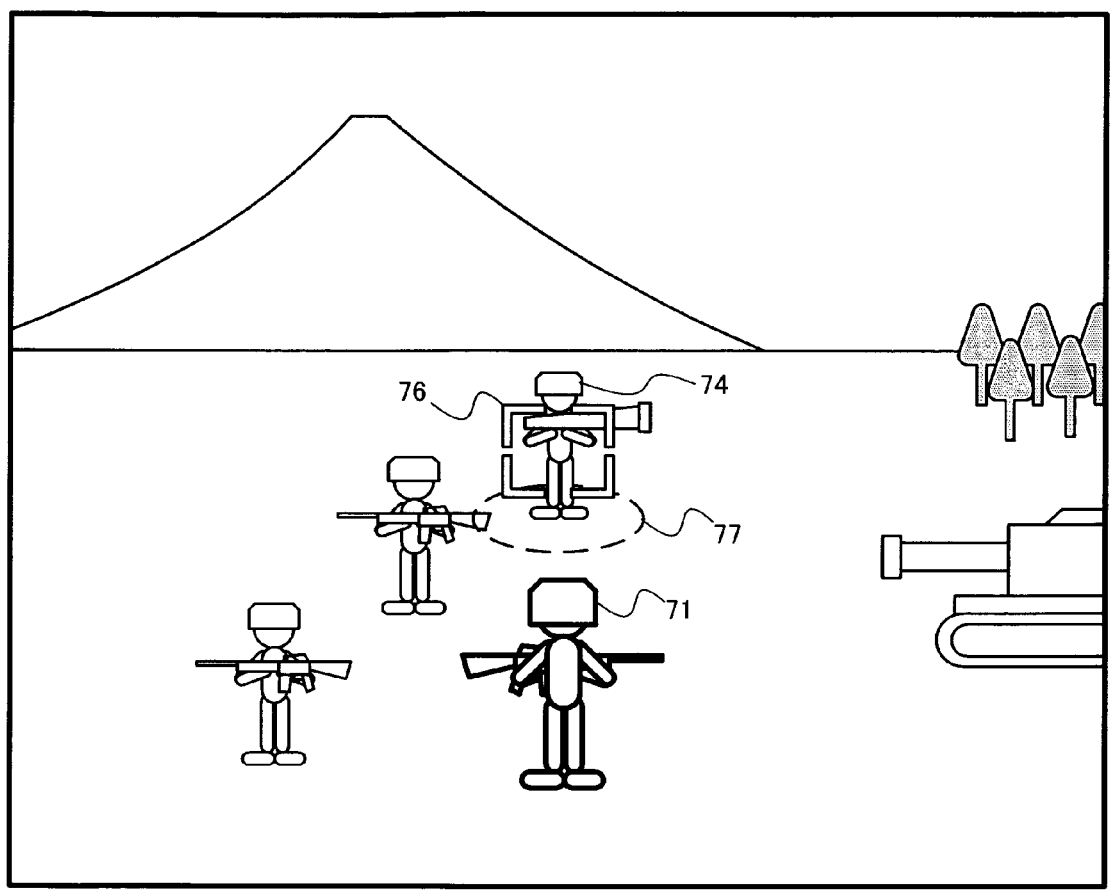
FIG. 4 shows a game screen displaying a state where a non-selected character is designated by an aiming cursor 76.

Next, a method for changing the selected character 71 using the aiming cursor 76 will be described. FIG. 4 shows a game screen displaying a state where a non-selected character is designated by the aiming cursor 76. In the following description, the selected character will be changed from the rifle solder character 71 to the bazooka solder character 74. For changing the selected character, the player first moves the aiming cursor 76 to the position at which the non-selected character to be selected next is to be designated (i.e., the player moves the selected character 71). In FIG. 4, the selected character 71 is slightly moved leftward from the state shown in FIG. 3, so that the aiming cursor 76 is moved to the position at which the bazooka solder character 74 is designated by the aiming cursor 76. In the case where the aiming cursor 76 designates a non-selected character, the ground cursor 77 is displayed as being located around the position of the designated non-selected character as the center. In FIG. 3, the ground cursor 77 is displayed as being located around the point on the ground designated by the aiming cursor 76 as the center; whereas in FIG. 4, the ground cursor 77 is displayed as being located around, as the center, the position of the feet of the selected character 74 which is designated by the aiming cursor 76. As can be appreciated from the above, in this embodiment, the display form of the ground cursor is changed in accordance with whether the non-selected character is designated by the aiming cursor 76 or not. This allows the player to perceive easily and intuitively whether the non-selected character is designated by the aiming cursor 76 or not.

Figure 5:
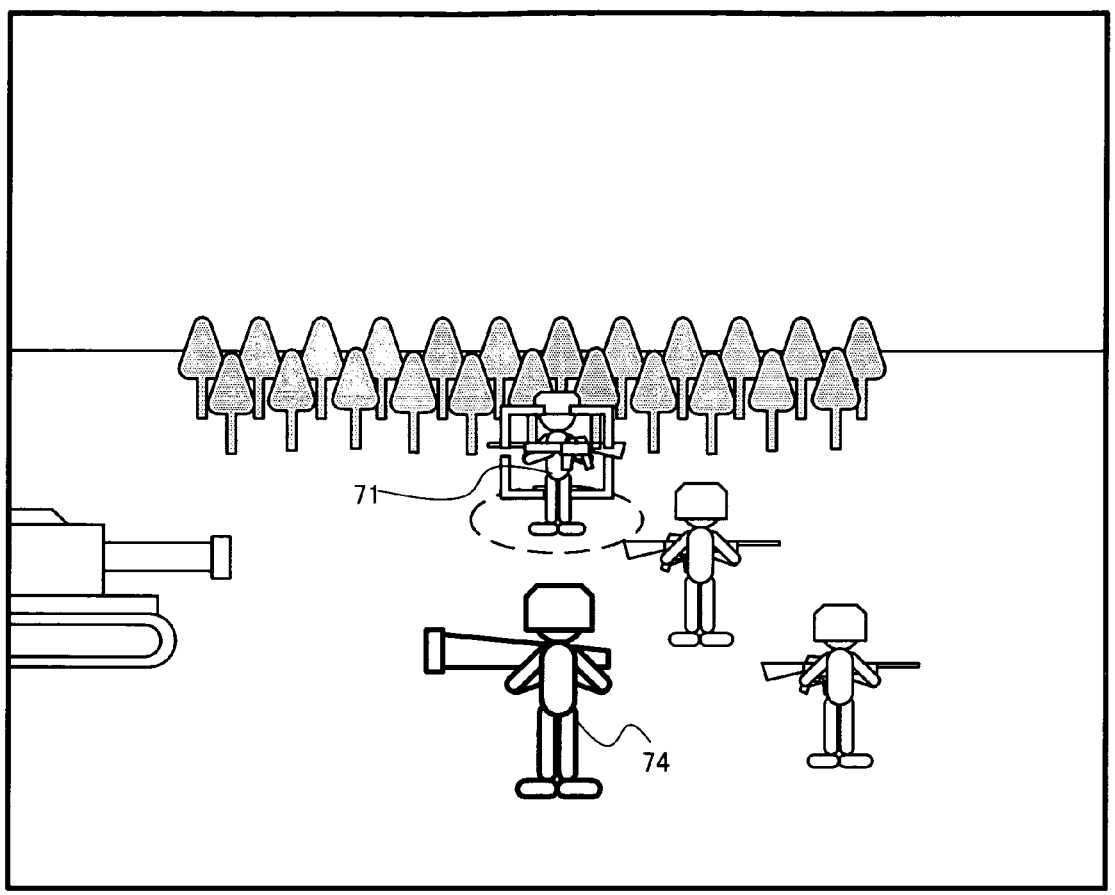
FIG. 5 shows a game screen after a selected character is changed from the state shown in FIG. 4.

When the player performs an operation of changing the selected character (for example, an operation of pressing the Z button of the controller 6; hereinafter, referred to as a "change operation") in the state shown in FIG. 4, the selected character is changed to the bazooka solder character 74. In accordance with the change of the selected character, the position and the orientation of the virtual camera are changed. FIG. 5 shows a game image after the selected character is changed from the state shown in FIG. 4. When the selected character is changed from the state shown in FIG. 4, as shown in FIG. 5, the settings of the virtual camera are changed to the settings based on the newly selected character 74. Namely, the game image displayed on the screen is changed to an image of an area in front of the bazooka solder character 74 as seen from behind the bazooka solder character 74. Since the operation target of the player is the bazooka solder character 74, the player can perform the above-mentioned detailed operations such as a moving operation or an attack operation on the bazooka solder character 74.

As described above, in this embodiment, the player can select any one of the player-side characters as the operation target, and freely change the operation target. Accordingly, the player can change the character on which detailed operations are to be performed in accordance with the game state, and thus can issue more detailed instructions on individual motions of the player-side characters than by the conventional art. Since this remarkably broadens the variety of actions which can be performed by the player-side characters, the strategic level of the game is improved and a more interesting game can be provided.

In this embodiment, the character to be selected next can be designated by the aiming cursor, which is displayed on the screen together with the image of the game space. Since the player can designate the non-selected character displayed on the screen as the character to be selected next, the player can easily perceive the character to be selected next. The aiming cursor is used for designating the target of attack as well as for designating the character to be selected next. Namely, in this embodiment, a cursor for designating the target of attack and a cursor for designating the character to be selected next are implemented by one aiming cursor. This can prevent the image on the screen from being hard to see due to the display of two cursors, i.e., the cursor for designating the target of attack and the cursor for designating the character to be selected next. This can also prevent the game operations from being complicated by the necessity of operating two cursors separately.

In this embodiment, the game image displayed on the screen is always as seen from behind the selected character. Accordingly, even after the selected character is changed, the player can instantaneously and intuitively perceive which character the newly selected character is. The player can also instantaneously and intuitively perceive that the selected character has been changed.

Figure 6:
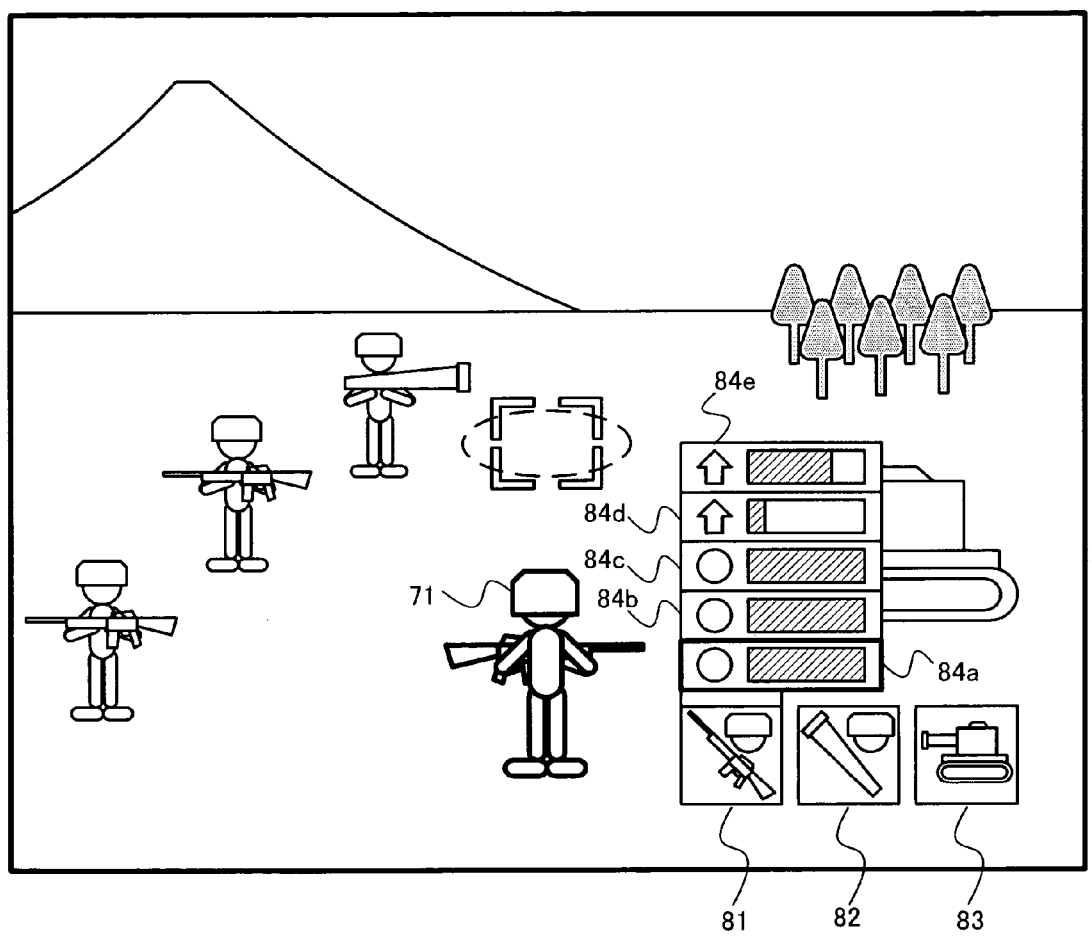
FIG. 6 shows a game screen displaying icons.

In this embodiment, the selected character may be changed using an icon instead of the aiming cursor. FIG. 6 shows a game screen displaying icons. In FIG. 6, icons 81 through 83, which represent the types of player-side characters, are displayed in a lower right area of the screen. An icon 81 represents the rifle solder character, an icon 82 represents the bazooka solder character, and an icon 83 represents the tank character. In this embodiment, there are three types of player-side characters, i.e., the rifle solder character, the bazooka character and the tank character. In an embodiment in which other types of characters such as combat plane or armed truck, icons by the number corresponding to the number of types of player-side characters are displayed. The player can switch the display/non-display state of the icons 81 through 83 by the operation of pressing, for example, the X button 65 of the controller 6. Alternatively, the display/non-display state of the icons 81 through 83 may be switched by the operation of tilting the C stick 87 of the controller 6. Still Alternatively, the icons 81 through 83 may be automatically switched to the non-display state when the icons 81 through 83 are displayed but no operation on any icon is performed for a predetermined time.

When the icons 81 through 83 are displayed, one of the icons 81 through 83 is in a designated state. The player can change the icon in the designated state (designated icon) using, for example, the left or right key of the cross-shaped key 62 of the controller 6. State windows regarding the type of player-side characters represented by the designated icon are also displayed. In FIG. 6, the icon 81 representing the rifle solder character is in the designated state, and state windows 84*a* through 84*e* each representing the individual state of the respective rifle solder character are displayed.

Each state window represents the individual state of the respective player-side character of the type represented by the designated icon. The state windows by the number of the player-side characters of the designated type which exist in the game space are displayed, regardless of whether each character is displayed on the screen or not. In FIG. 6, five state windows 84*a* through 84*e* regarding the rifle solder characters are displayed. Therefore, it is understood that the number of the rifle solder characters is five including the characters not displayed on the screen.

When the state windows 84*a* through 84*e* are displayed, one of the state windows 84*a* through 84*e* is in a designated state, like the case of the icons 81 through 83. The player can change the state window in the designated state (designated window) by changing the designated icon using the left or right key of the cross-shaped key 62. The player can also change the state window in the designated state (designated window) using, for example, the top or bottom key of the cross-shaped key 62 of the controller 6. In more detail, the player can change the non-selected character to be designated among the characters of the same type, by changing the designated window using the top or bottom key of the cross-shaped key 62. The designated state window 84*a* is, for example, displayed with a thicker frame than the other state windows 84*b* through 84*e* (see FIG. 6). A state window of the selected character may also be displayed as well as the state windows of the non-selected characters. It is preferable that the state window of the selected character is displayed in a different form so as to be distinguished from the other state windows. For example, it is preferable that the state window of the selected character is displayed with a different color from that of the other state windows, or that the state window of the selected character is always displayed at the bottom.

In a state window, an image representing the motion state of the character and a gauge representing the stamina of the character are displayed. The image representing the motion state of the character is an image of a circle or an arrow shown in a left part of each state window shown in FIG. 6. Specifically, the image of a circle represents that the character is in wait, and the image of an arrow represents that the character is in fight. Other conceivable motion states of a character include "following (the state of moving as following the selected character)" and "searching (the state of searching for an item)" in addition to the "in wait" and "in fight".

The gauge in each state window represents the stamina of the character. In this game, a parameter representing the stamina is set for each character appearing in the game space. When a parameter becomes zero, the corresponding character is erased from the game space. The gauge represents the value of the parameter. The hatched area of each gauge shown in FIG. 6 represents the current stamina. In the example shown in FIG. 6, it is understood that the characters represented by the uppermost and the second uppermost state windows 84*e* and 84*d* have stamina less than the upper limit thereof. It is understood that the characters represented by the other state windows 84*c* through 84*a* have stamina at the level of the upper limit.

The player can refer to the image representing the motion state and the gauge of the character to designate the state window representing the non-selected character to be selected next. With a desired state window being designated, the player performs the above-described change operation (the operation of pressing the Z button). This changes the selected character to the player-side character represented by the designated state window. After the selected character is changed, the settings (the position and the orientation) of the virtual camera are changed. As in the case shown in FIG. 4, the game image is changed.

As described above, in this embodiment, the selected character can be changed using an icon displayed on the screen. This method allows the player to designate even a player-side character not displayed on the screen as the character to be selected next. Thus, even a player-side character which cannot be designated using the aiming cursor can be designated.

In addition, the player can refer to the motion state and the stamina of the character displayed in the state window to learn the state of even a character not displayed on the screen to some extent. For example, when wishing to select a character in fight as the operation target, the player can refer to the image displayed in the state window to designate the character in fight as the character to be selected next. This allows the player to perform detailed game operations regarding the fight against an enemy character. The player can also refer to the gauge displayed in the state window to designate a character having decreased stamina as the character to be selected next. This allows the player to perform an operation on the character in detail with decreased stamina and thus to prevent the stamina of the character from becoming zero.

Next, a method for issuing an instruction on a motion to a non-selected character will be described. Here, two types of instructions can be issued to one non-selected character. A first instruction is to "follow". A non-selected character instructed to "follow" moves as following the selected character. Namely, the non-selected character is assigned a motion rule of "moving as following the selected character". A second instruction is to "move". A non-selected character instructed to "move" moves to a designated position and waits when reaching the position. Namely, the non-selected character is assigned a motion rule of "moving to a designated position and waiting when reaching the position". It is assumed that a non-selected character instructed to perform a motion by the player still continues complying with the default motion rule (the rule of "attacking an enemy character located with in a predetermined range from the non-selected character itself").

Figure 7:
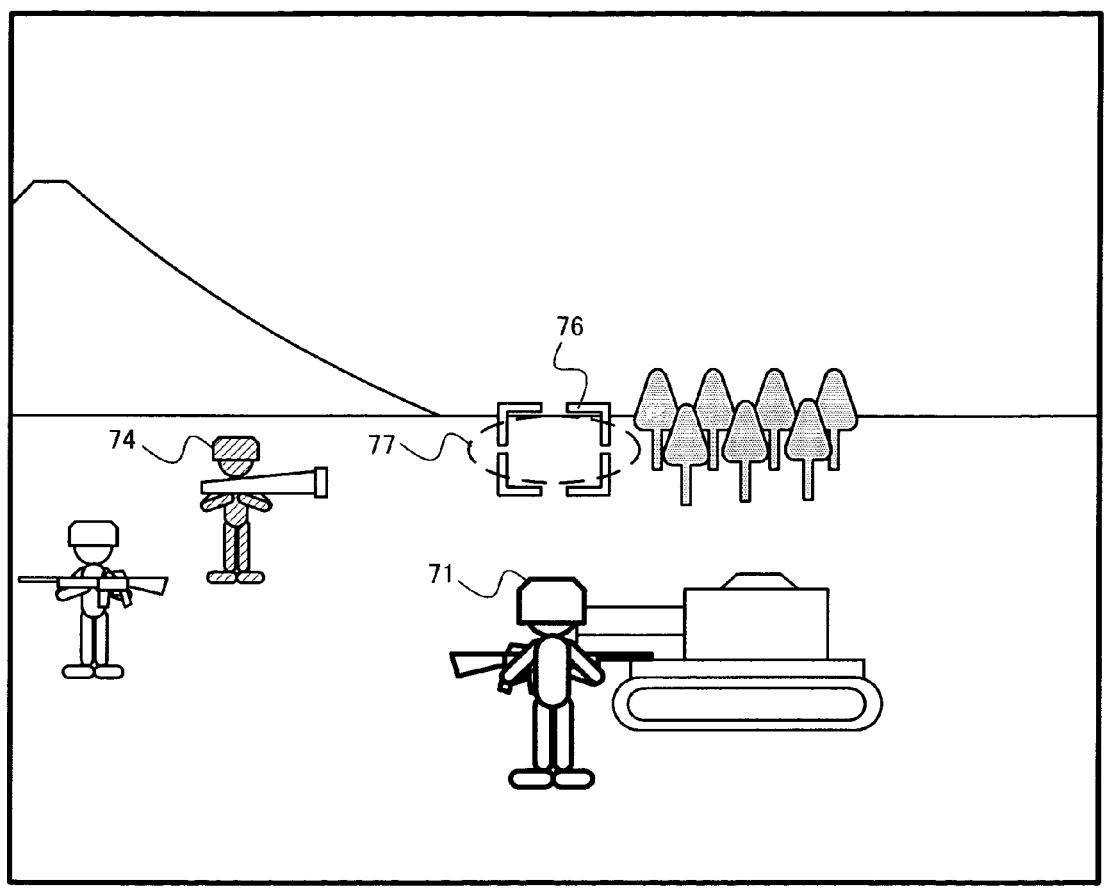
FIG. 7 shows a game screen displaying a state where a non-selected character to which a motion is to be instructed is designated.

FIG. 7 shows a game screen displaying a state where a non-selected character, to which a motion is to be instructed, is designated. For issuing an instruction to perform a motion to a non-selected character, the player first designates a non-selected character to which a motion is to be instructed using the aiming cursor. A method for designation using the aiming cursor is substantially the same as the method for designating a character to be selected next (see FIG. 4). In the state where anon-selected character to which the motion is to be instructed is designated by the aiming cursor (the state shown in FIG. 4), the player performs an operation of determining the non-selected character to which the motion is to be instructed (for example, an operation of pressing the B button 64 of the controller 6; hereinafter, referred to as a "character determination operation"). This allows the player to determine the non-selected character to which the motion is to be instructed. Hereinafter, the non-selected character determined as the character to which the motion is to be instructed will be referred to as an "instruction target character". In FIG. 7, the non-selected character 74 represented with hatching is the instruction target character. As shown in FIG. 7, the instruction target character is displayed in a different form from the other non-selected characters so as to be easily distinguishable therefrom.

In the state where the instruction target character is determined, the player can perform an instruction-to-follow operation or an instruction-to-move operation. The instruction-to-follow operation is an operation performed by the player to instruct to "follow", and is an operation of pressing an L button of the controller 6, for example. The instruction-to-move operation is an operation performed by the player to instruct to "move", and is an operation of pressing the R button of the controller 6, for example. When the player performs the instruction-to-follow operation in the state where the instruction target character is determined, the instruction target character performs the motion of "following". Namely, the instruction target character moves as following the selected character. If the selected character stops moving at this point, the instruction target character stops at a position away from the selected character by a predetermined distance. The instruction to "follow" is effective when the player intends to cause the selected character itself to attack an enemy character. When the player performs the instruction-to-move operation in the state where the instruction target character is determined, the instruction target character performs the motion of "moving". Namely, the instruction target character moves toward a position designated by the aiming cursor at the time when the instruction-to-move operation is performed, and waits when reaching the position. The instruction to "move" is effective when the player intends to cause the non-selected character to attack an enemy character.

As described above, in this embodiment, the player can issue an instruction on a motion to a non-selected character in addition to changing the selected character. Accordingly, when it is necessary to perform a detailed operation on a player-side character, the player may designate the player-side character as the selected character; whereas when only a rough operation is needed for a player-side character, the player may instruct a motion to the non-selected character. In this way, the player can choose whether to control the motion of a player-side character in detail or roughly in accordance with the state of the game. This can broaden the variety of motions of all the player-side characters and improve the strategic level of the game.

In this embodiment, an instruction target character is designated using the aiming cursor, like the method for designating the character to be selected next. Therefore, the player can perform two types of instruction operations with one aiming cursor, and thus can operate more easily than the case where two types of instruction operations are performed with different aiming cursors. In addition, when two types of instruction operations are performed with different aiming cursors, the two cursors need to be displayed on the screen. In this embodiment, only one cursor needs to be displayed, which makes the screen easier to see.

In other embodiments, the game apparatus 3 may further have a function of changing the size of the ground cursor in accordance with the operation by the player. The game apparatus 3 may have a function of instructing a motion to all the player-side characters encompassed in the ground cursor comprehensively. For example, the ground cursor may be enlarged in the state shown in FIG. 4, so that a plurality of player-side characters can be encompassed in the ground cursor. Namely, a plurality of player-side characters can be designated by the ground cursor. This allows the player to instruct a motion to a plurality of player-side characters by one operation.

An instruction target character may be designated using an icon mentioned above. More specifically, the icons 81 through 83 and the state windows shown in FIG. 6 may be displayed, and an instruction target character may be designated by one of the state windows.

Figure 8:
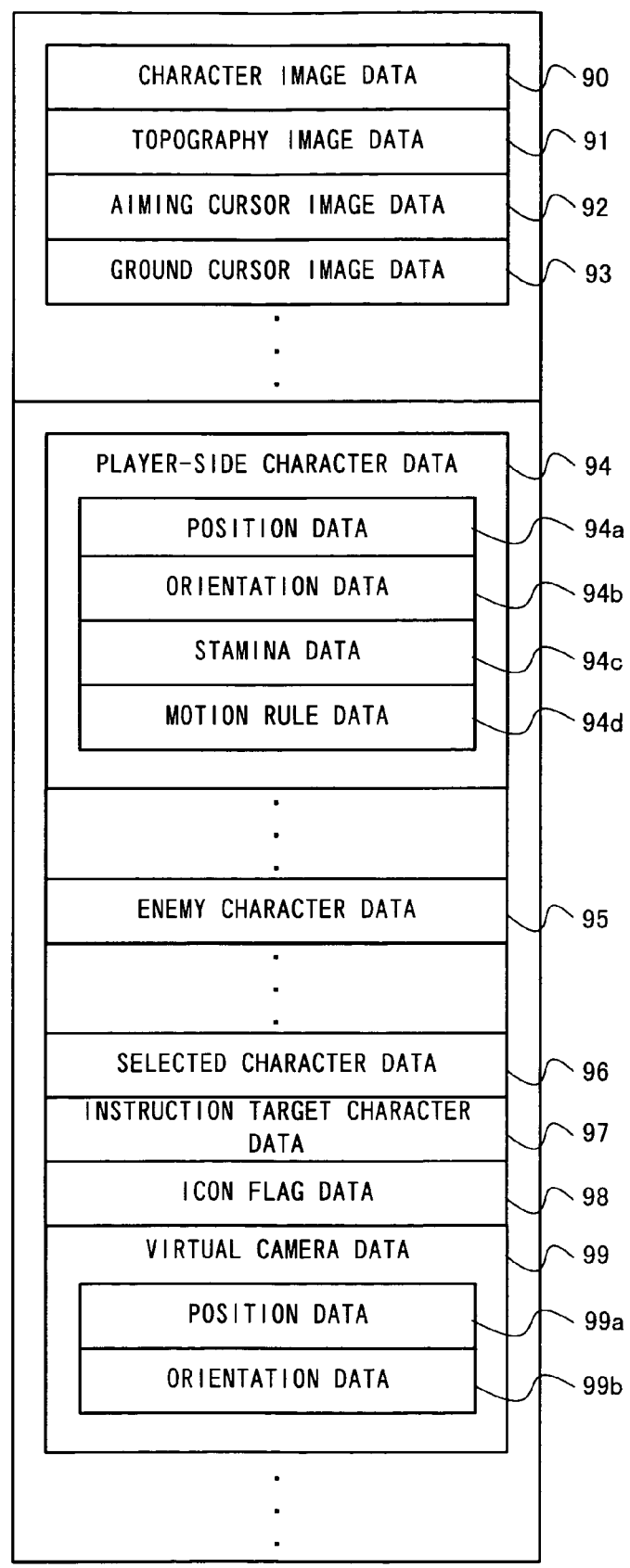
FIG. 8 shows main data stored in a work memory 32 of the game apparatus 3.

Next, the game processing performed by the game apparatus 3 by executing the game program will be described in detail. First, main data used in the game processing will be described with reference to FIG. 8. FIG. 8 shows main data stored in the work memory 32 of the game apparatus 3. As shown in FIG. 8, the work memory 32 has stored therein character image data 90, topography image data 91, aiming cursor image data 92, ground cursor image data 93 and the like as image data. The work memory 32 also has stored therein player-side character data 94, enemy character data 95, selected character data 95, instruction target character data 97, icon flag data 98, virtual camera data 99 and the like as other data used in the game processing.

In FIG. 8, the character image data 90 is data indicating an image of each character, such as a solder character or a tank character. The topography image data 91 is data indicating an image of the topography including the ground, mountains, forests and the like, which form the game space. The aiming cursor image data 92 is data indicating an image of the aiming cursor. The ground cursor image data 93 is data indicating an image of the ground cursor. In addition to such image data, the work memory 32 also includes image data of the icons, the state windows, items and the like. The image data stored in the work memory 32 has been transferred to the work memory 32 from the optical disc 4 having the data pre-stored therein, at an appropriate timing after the power of the game apparatus 3 is turned on.

The player-side character data 94 is data indicating various states of each player-side character. The player-side character data 94 is individually set for each player-side character. The player-side character data 94 includes position data 94a, orientation data 94b, stamina data 94c, and motion rule data 94d. The position data 94a is data indicating the current position of the player-side character (the position in the game space). The orientation data 94b is data indicating the current orientation of the player-side character. The stamina data 94c is data indicating the stamina of the player-side character. The motion rule data 94d is data indicating the motion rule currently assigned to the player-side character. Specifically, the motion rule data 94d indicates either one of "default", "following", "moving" and "selected". "Default" indicates that the default motion rule is assigned to the player-side character. "Following" indicates that the motion rule of "moving as following the selected character" is assigned to the player-side character. "Moving" indicates that the motion rule of "moving to a designated position and waiting when reaching the position" is assigned to the player-side character. "Selected" indicates that the player-side character is currently the selected character.

The enemy character data 95 is data indicating various states of an enemy character. Like the player-side character data 94, the enemy character data 95 is also individually set for each of the enemy characters. The enemy character data 95 includes at least data indicating the position and the orientation of the enemy character and data indicating the stamina of the enemy character. In the case where a motion rule is assigned also to the enemy characters, the enemy character data 95 may include data indicating the motion rule.

The selected character data 96 is data indicating the current selected character. Each player-side character is assigned an inherent number for identifying the player-side character (character number). The selected character data 96 indicates the character number of the player-side character currently selected as the selected character. The instruction target character data 97 is data indicating the current instruction target character. Specifically, the instruction target character data 97 indicates the character number of the player-side character currently designated as the instruction target character. When there is no instruction target character, the instruction target character data 97 indicates "NULL".

The icon flag data 98 is data indicating contents of an icon flag, i.e., whether the above-described icons (the icons 81 through 83 shown in FIG. 6) are being displayed or not. Specifically, when the icons are being displayed, the icon flag is set to "1"; whereas when the icons are not being displayed, the icon flag is set to "0".

The virtual camera data 99 is data indicating the setting contents of the virtual camera. The virtual camera data 99 includes position data 99a and orientation data 99b. The position data 99a indicates the position of the virtual camera in the game space. The orientation data 99b indicates the orientation of the virtual camera (i.e., the viewing direction of the virtual camera; may be the look at point of the virtual camera). The virtual camera data 99 may include data indicating the viewing angle or the like.

Figure 9:
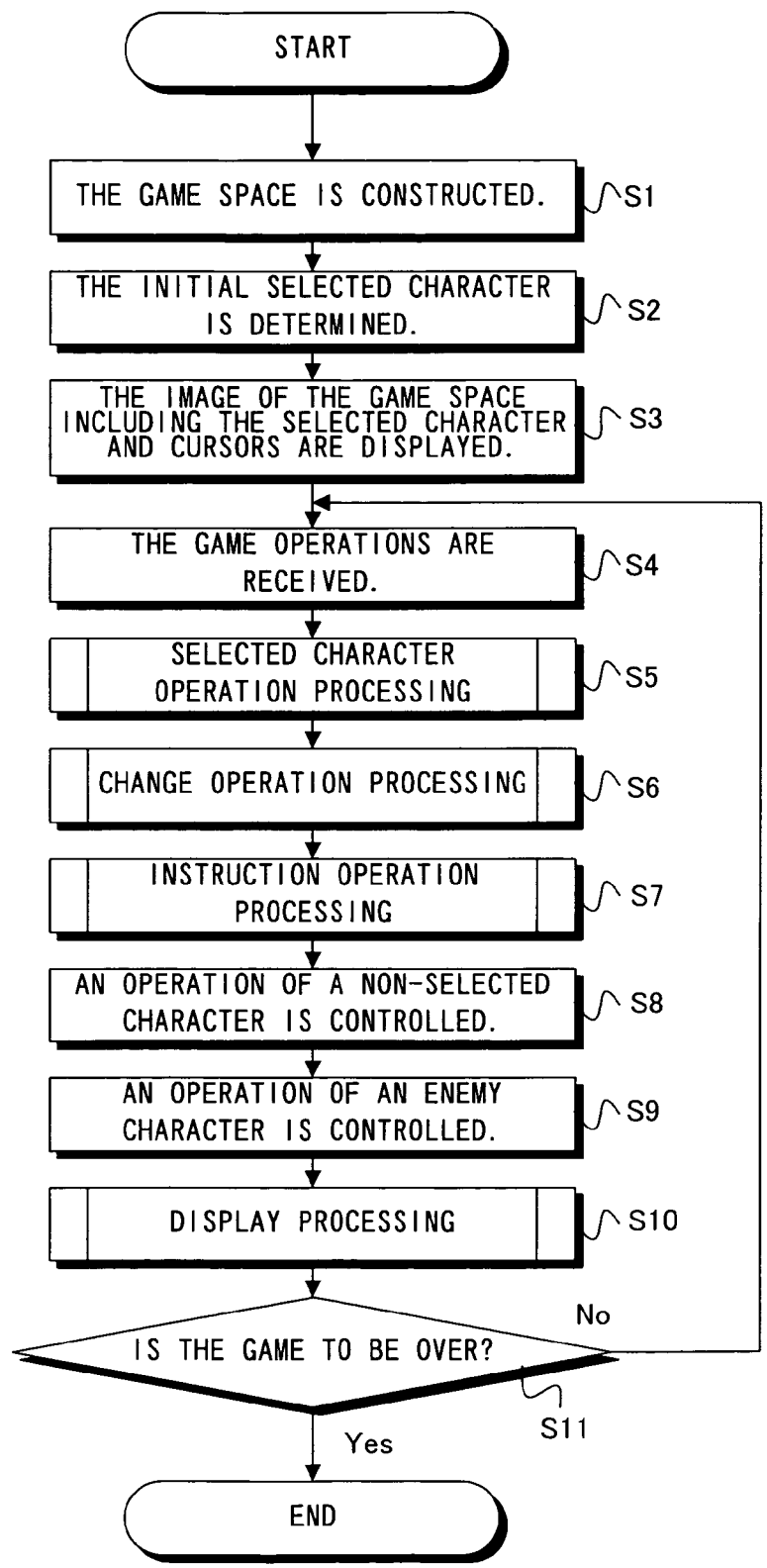
FIG. 9 is a flowchart illustrating a flow of game processing executed by the game apparatus 3.

Next, the game processing performed by the game apparatus 3 by executing the game program will be described in detail with reference to FIG. 9 through FIG. 14. FIG. 9 is a flowchart illustrating a flow of the game processing executed by the game apparatus 3. When the power of the game apparatus 3 is turned on, the CPU 31 of the game apparatus 3 executes a start program stored in a boot ROM (not shown) to initialize the elements such as the work memory 32 and the like. Then, the game program stored in the optical disc 4 is read into the work memory 32, and the CPU 31 starts executing the game program. The flowchart shown in FIG. 9 illustrates the game processing executed after such processing is finished.

With reference to FIG. 9, first in step S1, the game space is constructed. Specifically, a three-dimensional space including the ground, mountains and the like is constructed, and the player-side characters and the enemy characters are disposed in the constructed three-dimensional space. Then, in step S2, the selected character at the start of the game is determined. The first selected character may be predetermined by the game program, may be selected by the player from the player-side characters, or may be determined randomly from the player-side characters. The CPU 31 stores the character number of the player-side character determined as the selected character in the work memory 32 as the selected character data 96. When the selected character is determined in step S2, the initial position of the virtual camera is determined. The CPU 31 refers to the position data 94a and the orientation data 94b of the player-side character data 94 to calculate the initial position and orientation of the virtual camera based on the position and the orientation of the selected character. Data indicating the calculated position of the virtual camera is stored in the work memory 32 as the position data 99a of the virtual camera data 99, and data indicating the calculated orientation of the virtual camera is stored in the work memory 32 as the orientation data 99b of the virtual camera data 99.

Next, in step S3, an image of the game space and an image of each cursor are displayed on the screen of the TV 2. Namely, the CPU 31 uses the character image data 90, the topography image data 91 and the like stored in the work memory 32 to generate an image of the game space as seen from the virtual camera, the position and the orientation of which were calculated in step S2. Thus, the image of the game space including the selected character is generated. In addition, the CPU 31 refers to the virtual camera data 99 to calculate a position at which a line segment extending from the position of the virtual camera toward the viewing direction crosses the ground of the game space (the position of the look at point). Then, the CPU 31 uses the ground cursor image data 93 stored in the work memory 32 to generate a circular ground cursor on the ground, the center of which is the calculated position. The CPU 31 also refers to the aiming cursor image data 92 stored in the work memory 32 to generate an aiming cursor at a predetermined position crossing the line segment. The image of the game space generated in this manner (including the images of the cursors) is displayed on the screen of the TV 2. By steps S1 through S3, the game screen in the initial state is displayed. Next, in step S4, inputs of operations by the player are received, and the game is started.

In step S4, a game operation by the player is received. Specifically, the CPU 31 reads operation data indicating the game operation by the player from the controller 6. In the following steps S5 through S7, the game processing is executed in accordance with the game operation received in step S4.

In step S5, selected character operation processing is executed. The selected character operation processing is processing of controlling a motion of the selected character in accordance with the operation by the player. Hereinafter, the selected character operation processing will be described in detail with reference to FIG. 10.

Figure 10:
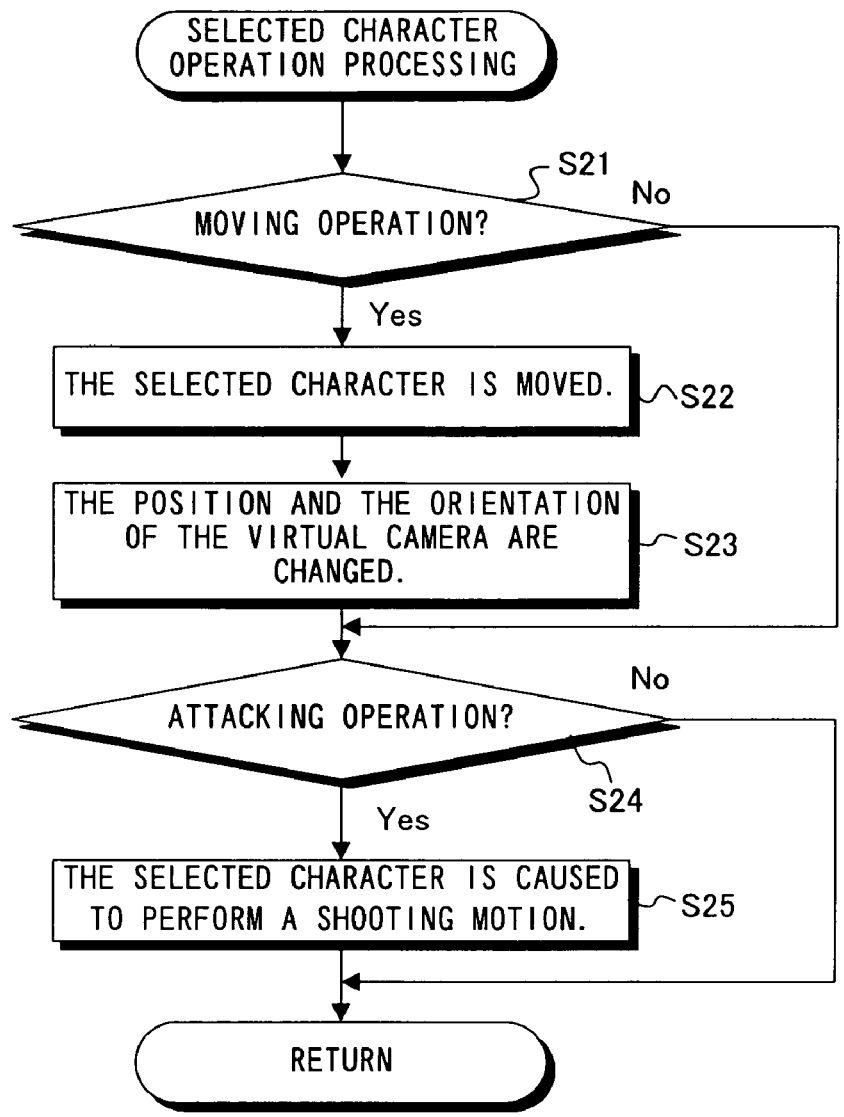
FIG. 10 is a flow chart illustrating detailed processing in step S5 shown in FIG. 9.

FIG. 10 is a flowchart illustrating the detailed processing in step S5 shown in FIG. 9. In the selected character operation processing, first in step S21, it is determined whether or not the operation received in step S4 is the moving operation described above. Specifically, the CPU 31 refers to the operation data read in step S4 to determine whether or not the analog stick 61 was operated. When it is determined in step S21 that the operation received in step S4 is the moving operation, processing in steps S22 and S23 is executed. By contrast, when it is determined in step S21 that the operation received in step S4 is not the moving operation, processing in step S22 and S23 is skipped and processing in S24 is executed.

In step S22, the selected character is moved in the game space in accordance with the operation received in step S4. Specifically, the CPU 31 refers to the operation data read in step S4 to obtain the angle and the direction at which the analog stick 61 was tilted. Then, the CPU 31 moves the position of the selected character in the game space in the direction corresponding to the tilting direction by a moving amount corresponding to the tilting angle. Namely, the contents of the position data 94a and the orientation data 94b of the player-side character data 94 corresponding to the selected character are updated. In this embodiment, the virtual camera is moved in accordance with the movement of the selected character, so that the aiming cursor moves relatively on the game screen. Accordingly, the position designated by the aiming cursor is moved by the processing in step S22.

Next, in step S23, the position and the orientation of the virtual camera are changed in accordance with the position and the orientation of the selected character which was moved in step S22. Specifically, the position of the virtual camera is set at a position which is behind, and away from, the position of the selected character by a predetermined certain distance and which is at a predetermined certain height. The virtual camera is set in the same orientation as that of the selected character with respect to a plane parallel to the ground but is downward by a predetermined angle with respect to a direction horizontal to the ground. The contents of the virtual camera data 99 are updated by the processing in step S23. The position of the virtual camera data 99 may be set at a predetermined height from the position of the feet of the selected character. In this case, it is not necessary to display the selected character on the game screen.

In step S24, it is determined whether or not the operation received in step S4 is an attack operation. Specifically, the CPU 31 refers to the operation data read in step S4 to determine whether or not the A button 63 was operated. When it is determined in step S24 that the operation received in step S4 is the attack operation, processing in step S25 is executed. By contrast, when it is determined in step S24 that the operation received in step S4 is not the attack operation, processing in step S25 is skipped and the CPU 31 terminates the selected character operation processing.

In step S25, the CPU 31 causes the selected character to perform a shooting motion. This causes a bullet to be discharged from the rifle, the bazooka or the like of the selected character toward the position designated by the aiming cursor (the position of the look at point of the virtual camera). After step S25, the CPU 31 terminates the selected character operation processing.

Returning to FIG. 9, in step S6 after step S5, change operation processing is executed. The change operation processing is processing regarding an operation of changing the selected character. Hereinafter, the change operation processing will be described in detail with reference to FIG. 11.

Figure 11:
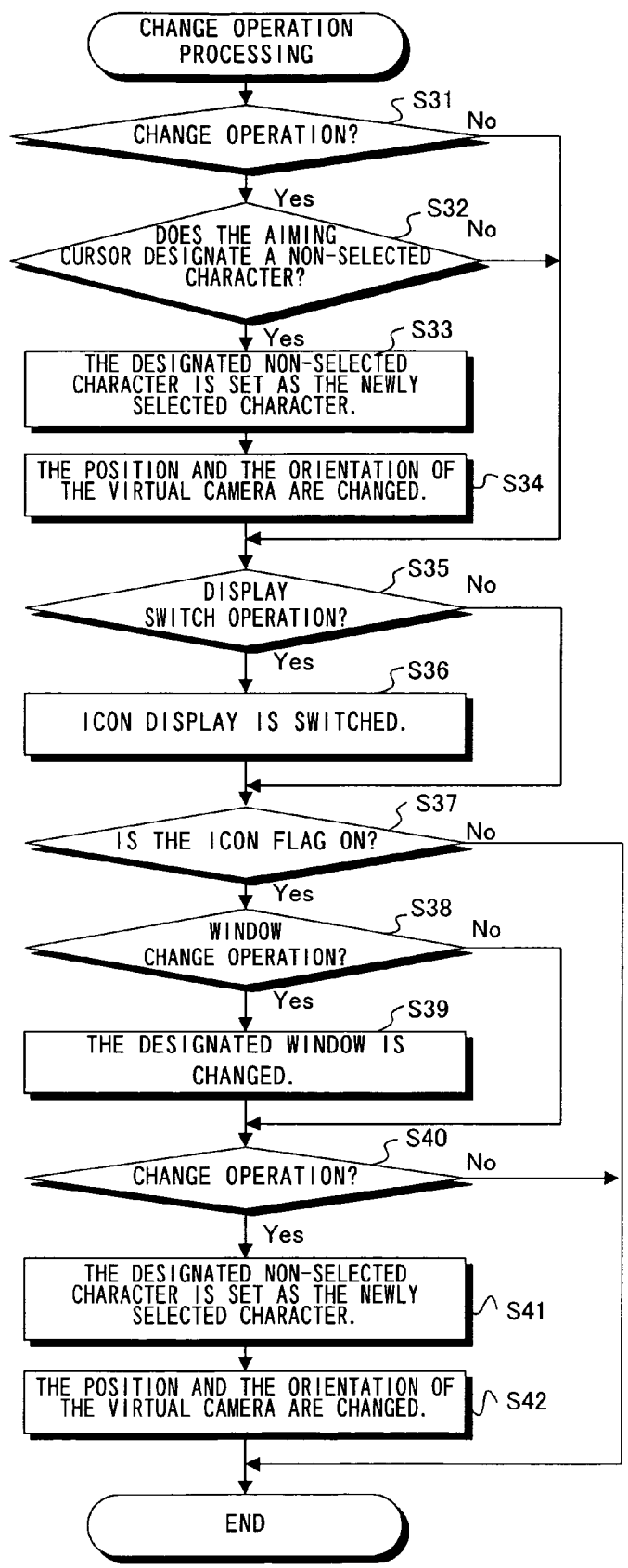
FIG. 11 is a flow chart illustrating detailed processing in step S6 shown in FIG. 9.

FIG. 11 is a flowchart illustrating the detailed processing in step S6 shown in FIG. 9. In the change operation processing, first in step S31, it is determined whether or not the operation received in step S4 is the change operation (the operation of changing the selected character). Specifically, the CPU 31 refers to the operation data read in step S4 to determine whether or not the Z button was operated. When it is determined in step S31 that the operation received in step S4 is the change operation, processing in step S32 is executed. By contrast, when it is determined in step S31 that the operation received in step S4 is not the change operation, processing in steps S32 through S34 is skipped and processing in S35 is executed.

In step S32, it is determined whether or not the aiming cursor designates a non-selected character. Specifically, the CPU 31 refers to the player-side character data 94 and the virtual camera data 99 to determine whether or not a straight line extending from the position of the virtual camera toward the viewing direction crosses any of the non-selected characters. When the straight line crosses any of the non-selected characters, the aiming cursor is determined as designating the non-selected character which first crosses the straight line. By contrast, when the straight line does not cross any of the non-selected characters, the aiming cursor is determined as not designating any non-selected character. When the aiming cursor is determined as designating a non-selected character, processing in steps S33 and S34 is executed. By contrast, when the aiming cursor is determined as not designating any non-selected character, the processing in steps S33 and S34 is skipped and processing in step S35 is executed.

In step S33, the non-selected character designated by the aiming cursor is set as the newly selected character. Specifically, the CPU 31 updates the contents of the selected character data 96 into the data indicating the character number of the non-selected character which has been newly selected. Next, in step S34, the position and the orientation of the virtual camera are changed in accordance with the position and the orientation of the selected character newly set in step S33. The position and the orientation of the virtual camera are set in step S34 in substantially the same manner as in step S23 described above. The contents of the virtual camera data 99 are updated by the processing in step S34. Since the processing in step S34 sets the virtual camera at a position based on the newly selected character, an image of the game space including the newly selected character is displayed in display processing in step S10 described later (see FIG. 5). After step S34, the processing in step S35 is executed.

In step S35, it is determined whether or not the operation received in step S4 is an operation of switching icon display (display switch operation). Specifically, the CPU 31 refers to the operation data read in step S4 to determine whether or not the X button 65 was operated. When it is determined in step S35 that the operation received in step S4 is the display switch operation, processing in step S36 is executed. By contrast, when it is determined in step S35 that the operation received in step S4 is not the display switch operation, processing in step S36 is skipped and processing in S37 is executed.

In step S36, icon display is switched. In more detail, when the icons are currently displayed, the icons and the state windows are erased from the display; whereas when the icons are not displayed, the icons and the state windows are started to be displayed. Specifically, the CPU 31 changes the contents of the icon flag data 98 in the work memory 32. In more detail, when the icons are currently displayed (when the icon flag is "1"), the icon flag is set to "0"; whereas when the icons are not displayed (when the icon flag is "0"), the icon flag is set to "1". After step S36, the processing in step S37 is executed.

In step S37, it is determined whether or not the icon flag is on. Specifically, the CPU 31 determines whether or not the icon flag data 98 in the work memory 32 is "1" (whether or not the icon flag is on). When the icon flag is determined as being on, processing in step S38 is executed. By contrast, when the icon flag is determined as not being on (determined as being off), the processing in steps S38 through S42 is skipped and the CPU 31 terminates the change operation processing.

In step S38, it is determined whether or not the operation received in step S4 is an operation of changing the designated window (see FIG. 6; window change operation). Specifically, the CPU 31 refers to the operation data read in step S4 to determine whether or not the cross-shaped key 62 was operated. When it is determined in step S38 that the operation received in step S4 is the window change operation, processing in step S39 is executed. In step S39, the designated window is changed in accordance with the operation by the player. When it is determined in step S38 that the operation received in step S4 is not the window change operation, processing in step S39 is skipped and processing in S40 is executed.

In step S40, it is determined whether or not the operation received in step S4 is the change operation. The determination processing in step S40 is executed in substantially the same manner as the processing in step S31. When it is determined in step S40 that the operation received in step S4 is the change operation, processing in steps S41 and S42 is executed. In step S41, the non-selected character indicated by the designated window is set as the newly selected character. Specifically, the CPU 31 updates the contents of the selected character data into the data indicating the character number of the non-selected character which has been newly selected. Next, in step S42, the position and the orientation of the virtual camera are changed. The processing in step S42 is executed in substantially the same manner as the processing in step S34. After step S42, the CPU 31 terminates the change operation processing.

When it is determined in step S40 that the operation received in step S4 is not the change operation, the processing in steps S41 and S42 is skipped and the CPU 31 terminates the change operation processing.

Returning to FIG. 9, in step S7 after step S6, instruction operation processing is executed. The instruction operation processing is processing regarding an operation of issuing an instruction on a motion to a non-selected character. Hereinafter, the instruction operation processing will be described in detail with reference to FIG. 12.

Figure 12:
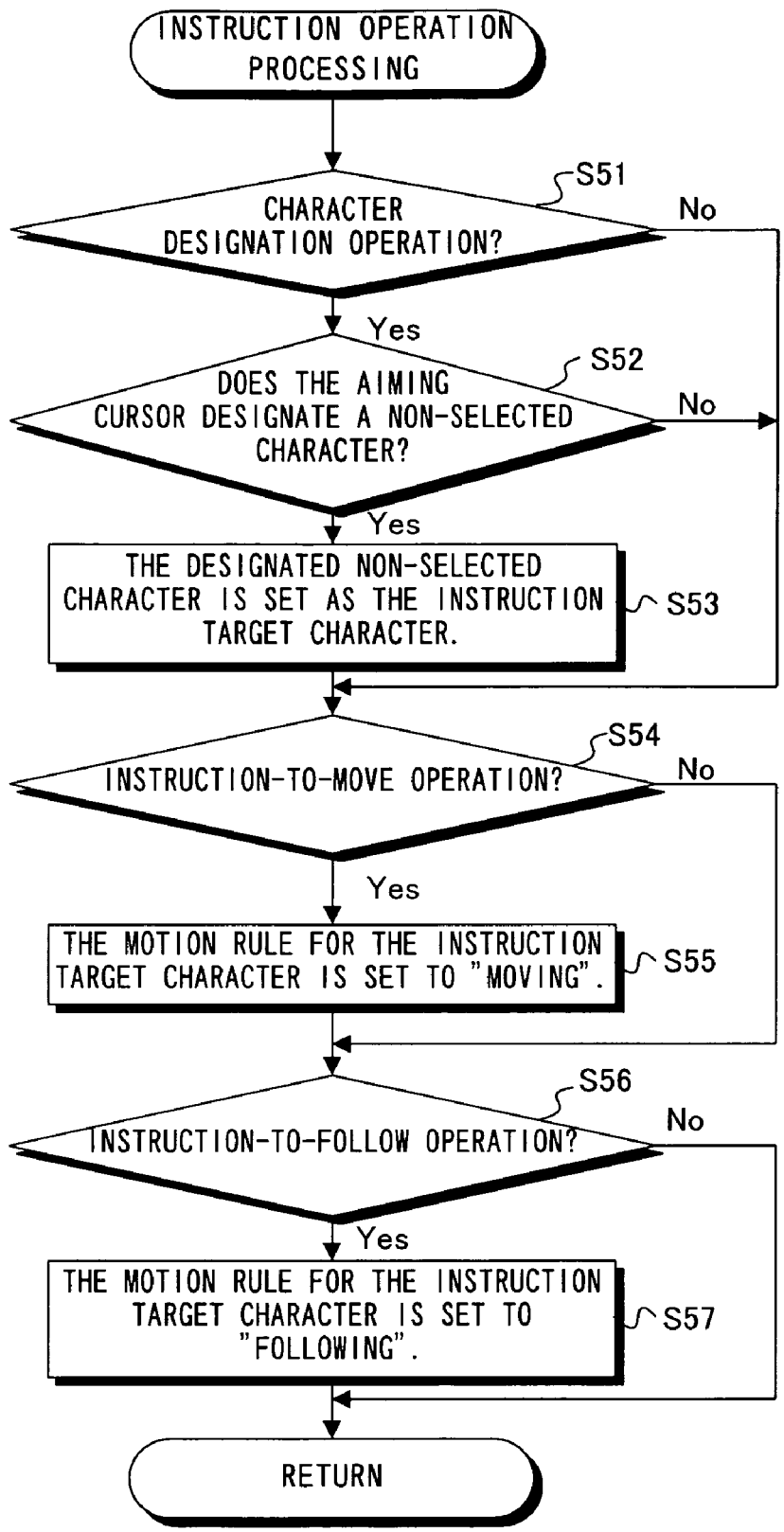
FIG. 12 is a flow chart illustrating detailed processing in step S7 shown in FIG. 9.

FIG. 12 is a flowchart illustrating the detailed processing in step S7 shown in FIG. 9. In the instruction operation processing, first in step S51, it is determined whether or not the operation received in step S4 is the character determination operation (the operation of determining the non-selected character to which a motion is to be instructed). Specifically, the CPU 31 refers to the operation data read in step S4 to determine whether or not the B button 64 was operated. When it is determined in step S51 that the operation received in step S4 is the character determination operation, processing in step S52 is executed. By contrast, when it is determined in step S51 that the operation received in step S4 is not the character determination operation, processing in step S52 and S53 is skipped and processing in S54 is executed.

In step S52, it is determined whether or not the aiming cursor designates a non-selected character. The processing in step S52 is executed in substantially the same manner as the processing in step S32. When the aiming cursor is determined as designating a non-selected character, processing in step S53 is executed. By contrast, when the aiming cursor is determined as not designating any non-selected character, the processing in steps S53 is skipped and processing in step S54 is executed.

In step S53, the non-selected character designated by the aiming cursor is set as the instruction target character. Specifically, the CPU 31 updates the contents of the instruction target character data 97 into the data indicating the character number of the non-selected character which has been set as the instruction target character. After step S53, the processing in step S54 is executed.

In step S54, it is determined whether or not the operation received in step S4 is the instruction-to-move operation (the operation of instructing the non-selected character to "move"). Specifically, the CPU 31 refers to the operation data read in step S4 to determine whether or not the R button was operated. When it is determined in step S54 that the operation received in step S4 is the instruction-to-move operation, processing in step S55 is executed. By contrast, when it is determined in step S54 that the operation received in step S4 is not the instruction-to-move operation, processing in step S55 is skipped and processing in S56 is executed.

In step S55, the motion rule for the instruction target character is set to "moving". Specifically, the CPU 31 updates the contents of the motion rule data 94*d* regarding the player-side character as the instruction target character into the data indicating "moving". As a result, in step S8 described later, the motion of the instruction target character is controlled in accordance with the motion rule of "moving". When there is no instruction target character, i.e., when the instruction target character data 97 stored in the work memory 32 indicates "NULL", the processing in step S55 is not executed. After step S55, the processing in step S56 is executed.

In step S56, it is determined whether or not the operation received in step S4 is the instruction-to-follow operation (the operation of instructing the non-selected character to "follow"). Specifically, the CPU 31 refers to the operation data read in step S4 to determine whether or not the L button was operated. When it is determined in step S56 that the operation received in step S4 is the instruction-to-follow operation, processing in step S57 is executed. By contrast, when it is determined in step S56 that the operation received in step S4 is not the instruction-to-follow operation, processing in step S57 is skipped and the CPU 31 terminates the instruction operation processing.

In step S57, the motion rule for the instruction target character is set to "following". Specifically, the CPU 31 updates the contents of the motion rule data 94*d* regarding the player-side character as the instruction target character into the data indicating "following". As a result, in step S8 described later, the motion of the instruction target character is controlled in accordance with the motion rule of "following". When there is no instruction target character, the processing in step S57 is not executed. After step S57, the CPU 31 terminates the instruction operation processing.

Returning to FIG. 9, in step S8 after step S7, the motion of the non-selected characters is controlled. Specifically, the CPU 31 follows the motion rule, indicated by the motion rule data 94d of each non-selected character stored in the work memory 32, to cause each non-selected character to perform a motion. As a result, each non-selected character actively performs a motion in accordance with the motion rule assigned thereto. In step S8, the CPU 31 appropriately updates the position data 94a and the orientation data 94b of each non-selected character. Next, in step 9, the motions of the enemy characters, the bullets from the rifles and the like are controlled. Namely, the position data of each enemy character is updated. At this point, it is determined whether or not the bullet hit a character (a player-side character or an enemy character), and the stamina of the character contacted by the bullet is reduced. Namely, the stamina data 94c of the corresponding character is updated. The motion of each character performed in steps S8 and S9 corresponds to one frame.

In step S10 after step S9, display processing is performed. The display processing is processing of displaying images of the game space, cursors and the like on the screen of the TV 2. Hereinafter, the display processing will be described in detail with reference to FIG. 13.

Figure 13:
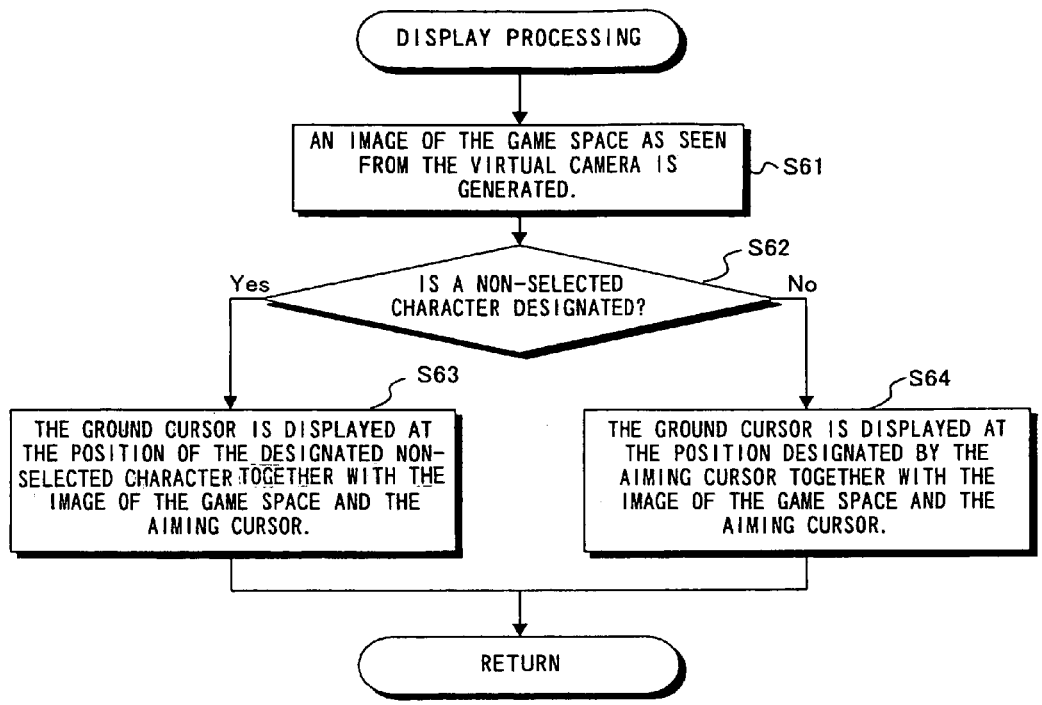
FIG. 13 is a flowchart illustrating detailed processing in step S10 shown in FIG. 9.

FIG. 13 is a flowchart illustrating the detailed processing in step S10 shown in FIG. 9. In the display processing, first in step S61, an image of the game space as seen from the virtual camera is generated. At this point, the settings of the virtual camera can be obtained by referring to the virtual camera data 99 in the work memory 32. Next, in step S62, it is determined whether or not the aiming cursor designates a non-selected character. The processing in step S62 is executed insubstantially the same manner as the processing in step S32. When the aiming cursor is determined as designating a non-selected character, processing in step S63 is executed. By contrast, when the aiming cursor is determined as not designating any non-selected character, processing in step S64 is executed.

In step S63, an image of the game space including the aiming cursor and the ground cursor is displayed on the screen of the TV 2. When the icon flag is on, the icons and the state windows are displayed over the image of the game space. The instruction target character is displayed with a different color from the other non-selected characters. In step S63, the ground cursor is displayed on the ground around the position of the currently designated non-selected character as the center (see FIG. 4). After step S63, the CPU 31 terminates the display processing.

In step S64, an image of the game space including the aiming cursor and the ground cursor is displayed on the screen of the TV 2, like in step S63. When the icon flag is on, the icons and the state windows are displayed over the image of the game space, like in step S63. The instruction target character is displayed with a different color from the other non-selected characters. In step S64, the ground cursor is displayed on the ground around the position designated by the aiming cursor (the position of the look at point of the virtual camera) as the center (see FIG. 3). After step S64, the CPU 31 terminates the display processing.

Returning to FIG. 9, in step S11 after step S10, it is determined whether or not the game is to be over. This determination is made based on, for example, whether or not the player-side characters are all destroyed (whether or not the stamina of all the player-side characters becomes zero), or whether or not the enemy characters are all destroyed. When it is determined that the game is not to be over yet, the processing in step S4 is executed again, and the processing in steps S4 through S10 is repeated until it is determined that the game is to be over. By contrast, when it is determined that the game is to be over, the CPU 31 terminates the game processing shown in FIG. 9.

In the above-described game processing, the attack operation is performed by pressing the A button 63 of the controller 6, and the change operation is performed by pressing the Z button of the controller 6. In other embodiments, the attack operation and the change operation may be performed by the same operation method (for example, the operation of pressing the A button 63). The reason is that in this game, the attack operation is not performed while the aiming cursor designates a player-side character; i.e., the attack operation and the change operation can never be performed at the same time. By assigning one type of operation method to the two types of operations, i.e., the attack operation and the change operation, the action performed by the player is simplified. Moreover, the attack operation and the change operation are both an operation of designating a target using the aiming cursor. Therefore, the player can either perform the attack operation or the change operation with one type of operation method using the analog stick 61 and the A button, which significantly simplifies the action performed by the player. In addition, in this embodiment, the operation of moving the aiming cursor is also the operation of moving the selected character. Therefore, the player can perform the attack operation, the change operation, and the moving operation of the selected character with one type of operation method using the analog stick and the A button.

As described above, in this embodiment, in a game in which a game space including a plurality of characters each of which can be an operation target of the player (player-side characters) is constructed, the player can freely switch the operation target to any one of the plurality of characters. Accordingly, in this embodiment, the player can issue an instruction to an individual player-side character in more detail than by the conventional art.

Figure 14:
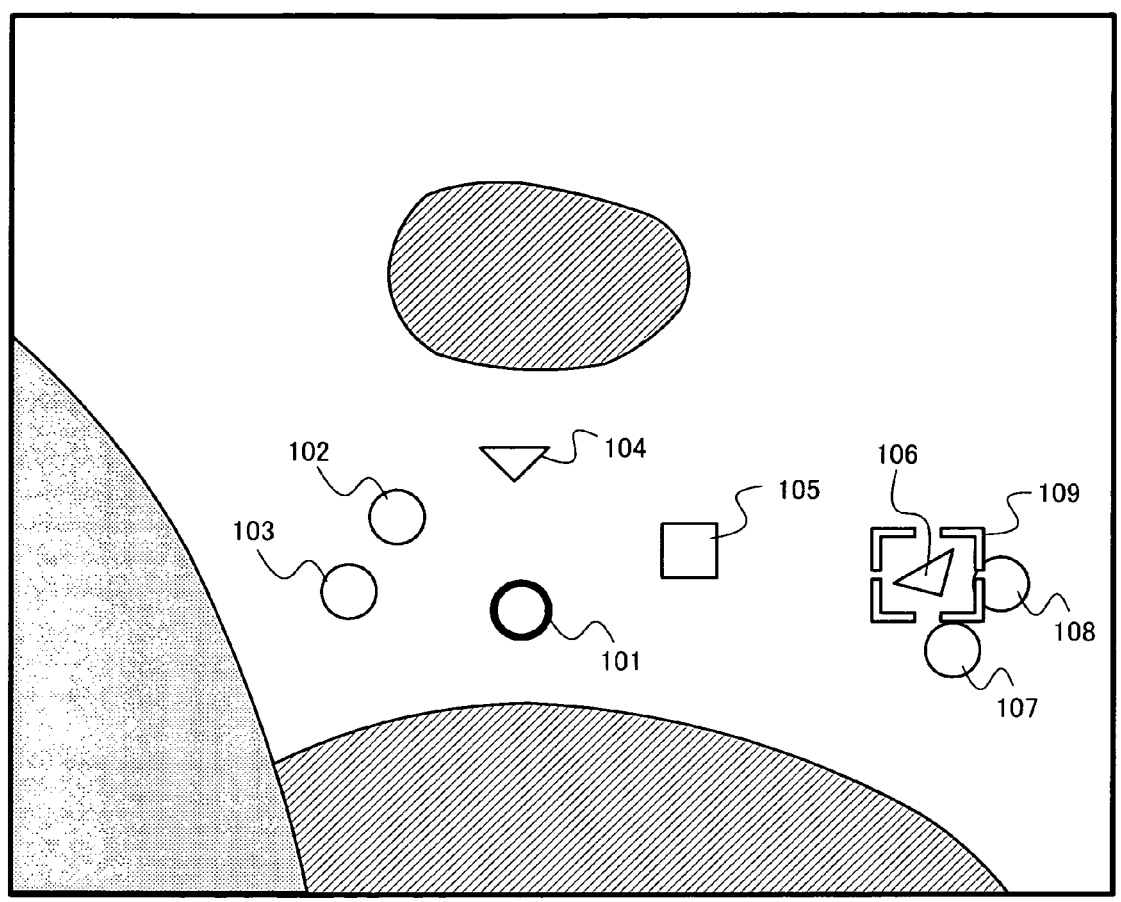
FIG. 14 shows an exemplary two-dimensional map.

In the above embodiment, the operation of selecting a player-side character as a newly selected character is performed by one of two methods, i.e., the method of using the aiming cursor and the method of using an icon. In other embodiments, a method of using a two-dimensional map may be used for selecting a player-side character, in addition to the above-mentioned two methods. FIG. 14 shows an exemplary two-dimensional map. For example, when the player performs a predetermined operation in the state where the game space is displayed, the two-dimensional map as shown in FIG. 14 may be displayed.

The two-dimensional map in FIG. 14 shows images of player-side characters. In this way, the player can learn the position of each player-side character. In FIG. 14, different types of characters are represented by different shapes of images. Namely, images 101 through 103, 107 and 108 each represent a rifle solder character; images 104 and 106 each represent a bazooka solder character; and an image 105 represents a tank character. The image representing the selected character is displayed in a different form from the images representing the non-selected characters. In FIG. 14, the image 101 represents the selected character and is displayed with a thicker line than the other images.

In the two-dimensional map shown in FIG. 14, a map cursor 109 is displayed. The player can move the map cursor 109 on the two-dimensional map by operating, for example, the analog stick 61. With the map cursor 109, one of the images 101 through 108 representing the player-side characters can be designated. For selecting a player-side character as a newly selected character, the player designates the image representing the corresponding player-side character by the map cursor 109. In the state where the image is designated by the map cursor 109, a predetermined determination operation is performed. As a result, the player-side character represented by the image is set as the newly selected character. At this point, the settings of the virtual camera are changed and an image of the game space as seen from the post-change virtual camera is displayed, as described above. In the example of FIG. 14, the image 106 is designated by the map cursor 109. Therefore, when the determination operation is performed in the state shown in FIG. 14, the image on the screen is changed to an image of the game space as seen from the virtual camera which is set based on the player-side character represented by the image 106. In this manner, a player-side character may be selected using the two-dimensional map.

In the above embodiment, in order to change the target designated by the cursor, the image of the game space displayed on the screen is changed while the cursor is fixed at the center of the screen. In other embodiments, the target of designation may be changed by moving the cursor on the screen while the image of the game space displayed on the screen is fixed. In this case, it is not necessary that the movement of the cursor and the movement of the virtual camera are associated with each other. The position and the orientation of the virtual camera may be changeable by the user independently from the moving operation of the cursor.

In the above embodiment, the determination on whether or not the cursor designates a character is performed based on whether or not a straight line extending from the position of the virtual camera toward the viewing direction crosses the character in the three-dimensional game space. In other embodiments, such a determination may be performed on a two-dimensional image. More specifically, such a determination may be performed based on whether or not the image of the cursor displayed on the screen overlaps the image of the character displayed on the screen. Alternatively, such a determination may be performed based on whether or not there is a character in the vicinity of the straight line (whether or not the distance from the straight line to the character is with in a predetermined length). Still alternatively, when the image of the cursor is located within a predetermined distance from the image of the character, the cursor may be determined as designating the character.

As described above, the present invention is usable for, for example, allowing the player, in a game in which the player performs an operation on a plurality of characters acting at the same time, to issue an instruction on a motion of each character in more detail.

While the invention has been described in detail, the foregoing description is in all aspects illustrative and not restrictive. It is understood that numerous other modifications and variations can be devised without departing from the scope of the invention.

What is claimed is:

1. A computer-readable storage medium having a game program stored therein to be executed by a computer of a game apparatus for causing a display apparatus to display an image of a three-dimensional game space, said game apparatus including a controller device for operating a plurality of player-controllable characters which appear on the display apparatus as seen from a virtual camera positioned within the game space, any one of which player-controllable characters can be designated as an operation target selected character in response to an operation of the controller device by a player, said game program causing the computer to perform operations of:

designating one of the plurality of player-controllable characters as an operation target selected character at a start of a game;

causing the player-controllable operation target selected character to perform a motion in accordance with a motion operation as indicated by the player by operating said controller device, and causing non-selected player-controllable characters, which are player-controllable characters other than the player-controllable operation target selected character, to autonomously perform a motion based on a predetermined motion rule;

setting a position of the virtual camera in accordance with a position and orientation of the operation target selected character wherein the display apparatus displays an image of a partial area of the three-dimensional game space as seen by the virtual camera, and wherein a displayed view of the game space changes in accordance with a motion of the operation target selected character;

displaying an aiming cursor at a center position within the displayed image of the partial area of the three-dimensional game space as seen by the virtual camera;

in response to a predetermined operation of the controller device made by a player after the aiming cursor is made to coincide with a position of one of the non-selected player-controllable characters displayed on the display, changing a designation of a player-controllable character from an operation target selected character to a non-selected player-controllable character and setting the non-selected player-controllable character as a new operation target selected character; and switching the position of the virtual camera to a new position and orientation associated with the new operation target selected character in response to setting said non-selected player-controllable character as the new player-controllable selected character, thus causing the display apparatus to display a view of a partial area of the three-dimensional game space as seen by the virtual camera from a new position and orientation.

2. A computer-readable storage medium according to claim 1, wherein:

when changing a designation of a player-controllable operation target selected character, a non-selected player-controllable character which is first intersected by a line-of-sight within the displayed image of the partial area is determined as the non-selected player-controllable character designated by the cursor.

3. A computer-readable storage medium according to claim 2, wherein:

when causing a player-controllable operation target selected character to perform a motion, an orientation and position of the operation target selected character is controlled in accordance with an operation performed by the player through use of the controller device; and an attack target is designated by making the displayed cursor position within the image of the partial area coincide with a displayed object.

4. A computer-readable storage medium according to claim 2, wherein when setting a position and orientation of the virtual camera, when there is a non-selected player-controllable character intersected by the line-of-sight, an image representing the non-selected player-controllable character which is intersected against by the line-of-sight is displayed.

5. A computer-readable storage medium according to claim 1, wherein:

when setting a position and orientation of the virtual camera, a list of corresponding images respectively corresponding to the non-selected player-controllable characters including a non-selected player-controllable character outside the partial area is further displayed regardless of the setting of the virtual camera; and the game program further causes the computer to perform operations of:

designating one of the corresponding images sequentially in accordance with a predetermined order, when a second operation by the player is performed; and changing the current selected player-controllable character to a non-selected player-controllable character, when the first operation by the player is performed in the state where any one of the corresponding images is designated, and changing the non-selected player-controllable character represented by the designated corresponding image to a newly selected player-controllable character.

6. A computer-readable storage medium according to claim 5, wherein the designated corresponding image is displayed over the image of the game space.

7. A computer-readable storage medium according to claim 5, wherein in the setting a position of the virtual camera, a state image indicating the state of the non-selected player-controllable character represented by the designated corresponding image is displayed together with the designated corresponding image.

8. A computer-readable storage medium according to claim 1, wherein:

when causing the operation target selected character to perform a motion, the motion of non-selected player-controllable characters are controlled based on one of a plurality of predetermined motion rules; and the game program further causes the computer to change the motion rule for a particular non-selected player-controllable character to a predetermined motion rule, when the aiming cursor is made to coincide with the particular non-selected player-controllable character and the player performs a predetermined operation using the controller device.

9. A computer-readable storage medium according to claim 1, wherein:

when setting a position of the virtual camera, a list of corresponding images respectively corresponding to the non-selected player-controllable characters including a non-selected player-controllable character outside the partial area is further displayed regardless of the setting of the virtual camera; and the game program further causes the computer to perform operations of:

designating one of the corresponding images sequentially in accordance with a predetermined order, when a second operation by the player is performed; and changing a motion rule for a non-selected player-controllable character represented by the designated corresponding image to the predetermined motion rule, when a third operation by the player is performed in the state where any one of the corresponding images is designated.

10. A computer-readable storage medium according to claim 1, wherein:

the game program further causes the computer to cause the operation target selected character to perform a predetermined motion in accordance with a motion instruction operation by the player;

the motion instruction operation is identical to an operation performed in changing a designation of a player-controllable character as a selected character to a non-selected player-controllable character; and when causing a player-controllable operation target selected character to perform a predetermined motion, the selected character performs a predetermined motion under a condition that none of the non-selected player-controllable characters is designated by making a cursor position on the display coincide with the position of the selected character.

11. A computer-readable storage medium having the game program according to claim 1, wherein the display apparatus displays a cursor within the image of the partial area displayed by the virtual camera and a position of the cursor is moved in response to an operation of the controller device by a player, and wherein the selection of the player-controllable selected character is received in response to an operation of the controller device by a player which results in making the cursor position on the display coincide with the position of the player-controllable selected character displayed on the display.

12. A game apparatus having a computer and being connected to a display apparatus to display an image of a three-dimensional game space, said game apparatus including a controller device for operating a plurality of player-controllable characters, any one of which can be designated as selected character by a player, and which appear on the display apparatus as seen from a virtual camera positioned within the game space, said game apparatus comprising:

selected character designating programmed logic circuitry configured to automatically designate one of the plurality of player-controllable characters as a player-controllable selected character at a start of a game;

motion control programmed logic circuitry configured to cause a player-controllable selected character to perform a motion in accordance with a motion operation as indicated by the player by operating said controller device, and to cause non-selected player-controllable characters, which are player-controllable characters other than the designated one player-controllable selected character, to autonomously perform a motion based on a predetermined motion rule;

first display control programmed logic circuitry configured to set a position of the virtual camera within the game space in accordance with a position and orientation of the player-controllable selected character and causing the display apparatus to display an image of a partial area of the three-dimensional game space as seen by the virtual camera, and further causing the display apparatus to display a changing view of the game space in accordance with a motion of the player-controllable selected character;

cursor display programmed logic circuitry configured to display an aiming cursor at a center position within the image of the partial area of the three-dimensional game space as seen by the virtual camera;

attack target designation programmed logic circuitry configured to designate a displayed enemy object as an attack target in response to a predetermined operation of the controller device once the aiming cursor position on the display is made to coincide with a position of the displayed enemy object on the display;

player-controllable character designation-change programmed logic circuitry configured to change a designation of a player-controllable character from a player-controllable selected character to a non-selected player-controllable character, and to set a non-selected player-controllable character as a new player-controllable selected character in response to a predetermined operation of the controller device by a player once the aiming cursor position is made to coincide with a position of a non-selected player-controllable character on the display; and second display control programmed logic circuitry configured to switch the position and orientation of the virtual camera to a new position and orientation associated with the new player-controllable selected character in response to setting said non-selected player-controllable character as the new player-controllable character and thus causing the display apparatus to display a view of a partial area of the three-dimensional game space as seen by the virtual camera from the new position and orientation.

* * * * *